US009230710B2

(12) United States Patent
Chiba et al.

(10) Patent No.: US 9,230,710 B2
(45) Date of Patent: Jan. 5, 2016

(54) POLYPROPYLENE-BASED RESIN EXPANDED BEADS, AND POLYPROPYLENE-BASED RESIN EXPANDED BEADS MOLDED ARTICLE

(71) Applicant: JSP CORPORATION, Tokyo (JP)

(72) Inventors: Takuya Chiba, Yokkaichi (JP); Masaharu Oikawa, Yokkaichi (JP); Mitsuru Shinohara, Yokkaichi (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 14/381,467

(22) PCT Filed: Feb. 8, 2013

(86) PCT No.: PCT/JP2013/053038

§ 371 (c)(1), (2) Date: Aug. 27, 2014

(87) PCT Pub. No.: WO2013/132957

PCT Pub. Date: Sep. 12, 2013

(65) Prior Publication Data

US 2015/0102269 A1 Apr. 16, 2015

(30) Foreign Application Priority Data

Mar. 5, 2012 (JP) ................................ 2012-047787

(51) Int. Cl.
*H01B 1/06* (2006.01)
*H01B 1/24* (2006.01)
(Continued)

(52) U.S. Cl.
CPC .. *H01B 1/24* (2013.01); *B29B 9/06* (2013.01); *C08J 9/224* (2013.01); *B29K 2023/06* (2013.01);
(Continued)

(58) Field of Classification Search
CPC .................... B29C 44/445; B29C 2049/4667; C08J 9/0061; C08J 9/232; C08J 2201/034
USPC .................... 252/511; 264/42, 45.9; 427/212; 428/336; 521/66
See application file for complete search history.

(56) References Cited

U.S. PATENT DOCUMENTS 8,129,438 B2 * 3/2012 Nohara .................. C08J 9/0061 427/212
2005/0215652 A1 * 9/2005 Tanaka .................... C08J 9/232 521/66
2012/0100376 A1 4/2012 Sakaguchi et al.

FOREIGN PATENT DOCUMENTS

EP 1486531 A1 12/2004
EP 1566255 A1 8/2005
(Continued)

OTHER PUBLICATIONS

Japanese Office Action in corresponding Japanese application 2012-047787 mailed Aug. 7, 2014.
(Continued)

*Primary Examiner* — Khanh Tuan Nguyen
(74) *Attorney, Agent, or Firm* — Bacon & Thomas, PLLC

(57) ABSTRACT

An electrostatic dissipative, polypropylene-based resin expanded bead having an expanded core layer of a polypropylene-based resin, and a cover layer that covers the expanded core layer and that is composed of a mixed resin containing electrically conductive carbon black, wherein the mixed resin includes a polypropylene resin which forms a continuous phase and a polyethylene resin which forms dispersed phases dispersed in the continuous phase, with the electrically conductive carbon black being unevenly distributed to the dispersed phases side. In-mold molding of the expanded beads gave a molded article.

20 Claims, 4 Drawing Sheets

(51) Int. Cl.

| | |
|---|---|
| ***C08J 9/224*** | (2006.01) |
| ***B29B 9/06*** | (2006.01) |
| *B29K 23/00* | (2006.01) |
| *B29K 105/04* | (2006.01) |
| *B29K 507/04* | (2006.01) |

(52) U.S. Cl.

CPC ......... *B29K 2023/12* (2013.01); *B29K 2105/04* (2013.01); *B29K 2507/04* (2013.01); *B29K 2995/0005* (2013.01); *C08J 2201/038* (2013.01); *C08J 2323/12* (2013.01); *C08J 2423/06* (2013.01)

(56) References Cited

FOREIGN PATENT DOCUMENTS

| | | | |
|---|---|---|---|
| JP | S41-16125 | B | 9/1966 |
| JP | S43-23858 | B | 10/1968 |
| JP | S44-29522 | B | 12/1969 |
| JP | 58-125727 | A | 7/1983 |
| JP | S60-185816 | A | 9/1985 |
| JP | H07-304895 | A | 11/1995 |
| JP | 08-225675 | A | 9/1996 |
| JP | H09-202837 | A | 8/1997 |
| JP | H10-251436 | A | 9/1998 |
| JP | 2000-169619 | A | 6/2000 |
| JP | 2001-151928 | A | 6/2001 |
| JP | 2004-083804 | A | 3/2004 |
| JP | 2004068016 | A | 3/2004 |
| JP | 2006-232939 | A | 9/2006 |
| JP | 2009173021 | A | 8/2009 |
| WO | 2010/150466 | A1 | 12/2010 |

OTHER PUBLICATIONS

International Search Report (ISR) fated May 7, 2013, for PCT/JP2013/053038.

European Supplementary Search Report dated Aug. 27, 2015, for EP 13758661.

Database WPI, Week 200442, Thomas Scientific, London, GB, AN 2004-443636, XP002743660.

* cited by examiner

POLYPROPYLENE-BASED RESIN EXPANDED BEADS, AND POLYPROPYLENE-BASED RESIN EXPANDED BEADS MOLDED ARTICLE

TECHNICAL FIELD

The present invention relates to polypropylene-based resin expanded beads and to a polypropylene-based resin expanded beads molded article. More particularly, the present invention is directed to polypropylene-based resin expanded beads that can give a polypropylene-based resin expanded beads molded article having electrostatic dissipating properties and to a polypropylene-based resin expanded beads molded article obtained by in-mold molding of the expanded beads.

RELATED ART

Polypropylene-based resins are well-balanced in terms of mechanical strength and heat resistance. Molded articles produced by in-mold molding of expanded beads constituted of such a polypropylene-based resin as a base resin not only have excellent properties inherent in the polypropylene-based resin but also are excellent in shock-absorbing properties and in recovery from compressive strain, and are therefore used in a wide variety of applications including packaging materials for electric and electronic components and shock-absorbing materials for automobiles.

However, because polypropylene-based resins are materials with a high electrical resistance, foamed molded articles constituted of a polypropylene-based resin as a base resin tend to be electrically charged. Thus, expanded beads molded articles to which antistatic performance or conductive performance has been imparted are used as the packaging materials for electronic components and so on which must be kept away from static electricity (Patent Documents 1-6).

Patent Document 1: JP-A-H07-304895

Patent Document 2: JP-A-2009-173021

Patent Document 3: JP-A-H09-202837

Patent Document 4: JP-A-H10-251436

Patent Document 5: JP-A-2000-169619

Patent Document 6: JP-A-2006-232939

SUMMARY OF THE INVENTION

In recent years, the improvement in performance of electronic components, such as integrated circuits and hard disks, has created a demand for an electrostatically dissipative material having a surface resistivity of $1\times10^5$ to $1\times10^{10}\Omega$ to prevent the electronic components from being damaged by static electricity. However, a polypropylene-based resin expanded beads molded article having a surface resistivity of $1\times10^5$ to $1\times10^{10}\Omega$ has not been able to be produced stably by a conventional antistatic or conductivity-imparting treatment technology.

For example, as methods for imparting antistatic performance to a polypropylene-based resin expanded beads molded article, there are proposed a method in which antistatic expanded beads obtained by foaming and expanding resin particles containing a surfactant are in-mold molded to obtain an expanded beads molded article (as disclosed in Patent Document 1) and a method in which expanded beads obtained by foaming and expanding resin particles covered with a resin layer containing a polymeric antistatic agent are in-mold molded to obtain an expanded beads molded article (as disclosed in Patent Document 2).

These methods are effective in producing an expanded beads-molded article having antistatic performance. With a method in which an antistatic agent as described above is compounded in a polypropylene-based resin, however, it is difficult to achieve a surface resistivity of not higher than $1\times10^{10}\Omega$ using a suitable amount of the antistatic agent, because there is a limitation in the electrical characteristics of the antistatic agent itself. When a large amount of the antistatic agent is added for the purpose of achieving a surface resistivity of not higher than $1\times10^{10}\Omega$, the resulting expanded beads show considerably poor expansion property and fusion bonding property at the time of molding.

As a method for imparting electrical conductivity to a polypropylene-based resin expanded beads molded article, a method is known in which an electrically-conductive inorganic substance, such as an electrically-conductive carbon black or metal powder, is added to the base resin of the expanded beads to create in the base resin an electrically-conductive network of the electrically-conductive inorganic substance as disclosed in, for example, Patent Documents 3 to 5. There is also a method in which, as disclosed in Patent Document 6, electrically-conductive expanded beads, obtained by foaming and expanding resin particles each covered with an electrically-conductive carbon black-containing resin layer, are in-mold molded to obtain an expanded beads molded article. With these method, polypropylene-based resin expanded beads molded articles having a surface resistivity of lower than $1\times10^5\Omega$ can be produced with ease.

In order to obtain an expanded beads molded article having a surface resistivity of $1\times10^5$ to $1\times10^{10}\Omega$ by a method using an electrically-conductive inorganic substance, it is thought effective to reduce the content of the electrically-conductive inorganic substance. However, a so-called percolation phenomenon, in which the surface resistivity shows a sharp discontinuous change, occurs when the content of electrically-conductive inorganic substance is reduced to a certain level (percolation threshold). It is, therefore, difficult to achieve a surface resistivity in the range of $1\times10^5$ to $1\times10^{10}\Omega$ in a stable manner.

In particular, conventional polypropylene-based resin expanded beads molded articles that contain an electrically-conductive inorganic substance have a problem that a drastic discontinuous change occurs in their surface resistivity in a region close to the percolation threshold. One possible reason for this is the fact that at least two expansion steps, expansion of resin particles into expanded beads and secondary expansion of the expanded beads during in-mold molding, must be carried out to obtain an expanded beads molded article. Namely, the surface resistivity is greatly influenced by the distance between electrically conductive carbon black particles, but it is difficult to control the distance between the electrically-conductive carbon black particles contained in the polypropylene-based resin during the expansion that takes place in the two expansion steps. Thus, it is considered that because the surface resistivity varies with a change in distance between the electrically conductive carbon black particles, it is very difficult to stably achieve a surface resistivity of $1\times10^5$ to $1\times10^{10}\Omega$.

The above methods have another problem because even a slight difference in dispersion state of the electrically-conductive inorganic substance results in a significant variation in the surface resistivity of the expanded beads-molded article. Thus, even when the expanded beads molded article has a desired performance as a whole, some portions of the molded article may have a surface resistivity outside the desired range.

It is, therefore, an objective problem of the present invention to provide polypropylene-based resin expanded beads that excel in expansion property and fusion bonding property during molding and that are capable of giving a polypropylene-based resin expanded beads molded article which can stably exhibit electrostatic dissipating properties of a surface resistivity range of $1\times10^5$ to $1\times10^{10}\Omega$ while maintaining excellent properties inherent in the polypropylene-based resin, and to provide a polypropylene-based resin expanded beads molded article obtained by in-mold molding of such expanded beads.

In accordance with the present invention, there are provided polypropylene-based resin expanded beads and a polypropylene-based resin expanded beads molded article, as follows:

[1] An electrostatic dissipative, polypropylene-based resin expanded bead comprising an expanded core layer comprising a polypropylene-based resin, and a cover layer that covers the expanded core layer and that comprises a mixed resin containing electrically conductive carbon black, wherein the mixed resin comprises a polypropylene resin which forms a continuous phase and a polyethylene resin which forms dispersed phases dispersed in the continuous phase, the electrically conductive carbon black is unevenly distributed to the dispersed phases side and present in an amount of 5 to 30 parts by weight per 100 parts by weight of a total amount of the polypropylene resin and the polyethylene resin, the polypropylene resin and the polyethylene resin are present in such a proportion as to provide a weight ratio of the polypropylene resin to the polyethylene resin is 99.5:0.5 to 50:50, and the expanded bead has an apparent density of 10 to 120 kg/m$^3$;

[2] The polypropylene-based resin expanded bead according to above [1], wherein the cover layer has an average thickness of 0.2 μm or more;

[3] The polypropylene-based resin expanded bead according to above [1] or [2], wherein the electrically conductive carbon black is Ketjen black and present in an amount of 5 to 15 parts by weight per 100 parts by weight of the total amount of the polypropylene resin and the polyethylene resin; and

[4] A molded article comprising the expanded beads according to any one of above [1] to [3] which are integrally fusion bonded together, said molded article having a surface resistivity of $1\times10^5$ to $1\times10^{10}\Omega$.

[5] A process for producing electrostatic dissipative, polypropylene-based resin expanded beads having an apparent density of 10 to 120 kg/m3 and each comprising an expanded core layer comprising a polypropylene-based resin and a cover layer that covers the expanded core layer and that comprises a mixed resin containing electrically conductive carbon black, said process comprising the steps of:

feeding a molten resin, obtained by melting and kneading a polypropylene-based resin, for forming a core layer of resin particles into a coextrusion die together with a molten resin, obtained by melting and kneading a polypropylene resin, a polyethylene resin and electrically conductive carbon black, for forming a cover layer of the resin particles, to form a molten resin composition that has a core-sheath structure in which the molten resin for forming a cover layer of the resin particles is laminated to surround a linear flow of the molten resin for forming a core layer of resin particles, extruding the molten resin composition through small holes, cutting the extruded molten resin composition to obtain composite resin particles in which the polypropylene-based resin core layer is covered with the electrically conductive carbon black-containing mixed resin cover layer; and impregnating the composite resin particles with a blowing agent and expanding and foaming the composite resin particles;

wherein a mixing proportion of the polypropylene resin and the polyethylene resin, in terms of weight ratio of the polypropylene resin to the polyethylene resin, is 99.5:0.5 to 50:50, and a mixing proportion of the carbon black is 5 to 30 parts by weight per 100 parts by weight of a total amount of the polypropylene resin and the polyethylene resin.

The electrostatic dissipative polypropylene-based resin expanded bead(s) (hereinafter occasionally referred to simply as "expanded bead(s)") according to the present invention are obtained by foaming and expanding composite resin particles, which have a polypropylene-based resin core layer covered with a specific polyolefin-based resin cover layer containing electrically conductive carbon black, to such a degree as to provide a specific range of apparent density. This makes it possible to stably obtain a polypropylene-based resin expanded beads molded article (hereinafter occasionally referred to simply as "molded article") having a surface resistivity in the range of $1\times10^5$ to $1\times10^{10}\Omega$ in a stable manner.

Because the expanded beads of the present invention show only a small variation of their electrical resistivity by a change in their apparent density, the molded article obtained from the expanded beads of the present invention shows smaller change in its surface resistivity due to changes in molding conditions and in molding devices, compared with the conventional polypropylene-based resin expanded beads molded article containing an inorganic electrically conductive material, and exhibits electrostatic dissipative properties in a stable manner even when the article has a complicated shape.

DETAILED DESCRIPTION OF THE INVENTION

Figure 1:
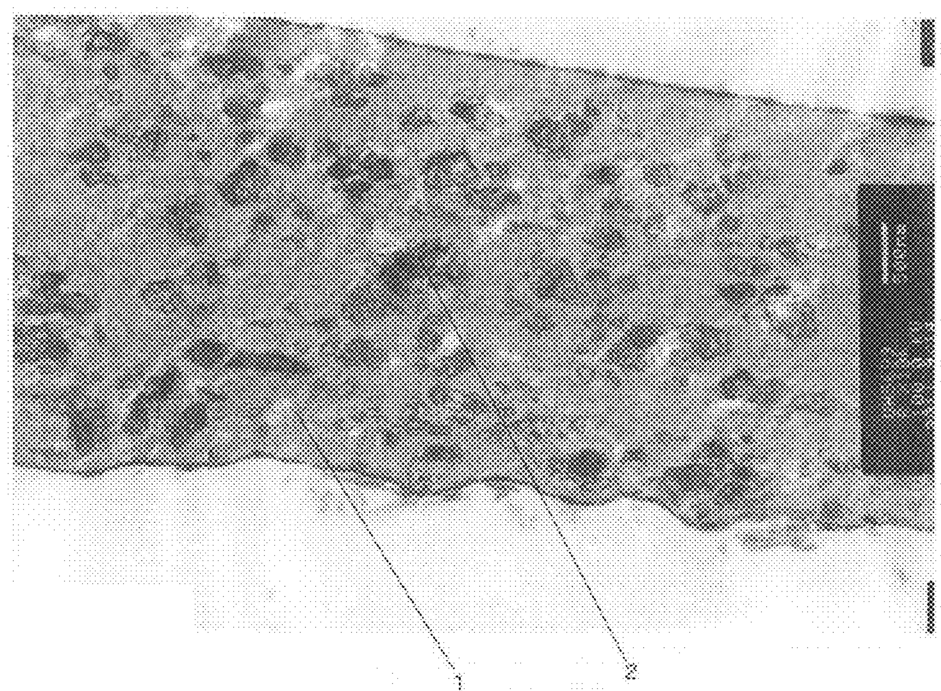
FIG. 1 is a microphotograph of a cross-section of a mixed resin cover layer of an expanded bead obtained in Example 1, showing a sea-island structure formed of a polypropylene resin and a polyethylene resin.

Description is hereinafter made of the expanded bead of the present invention. The expanded bead has a structure in which at least a part of a polypropylene-based resin expanded core layer (hereinafter occasionally referred to simply as "expanded core layer") is covered with a cover layer of a mixed resin containing electrically conductive carbon black (hereinafter occasionally referred to simply as "cover layer"). As used herein, the term "polypropylene-based resin" is intended to refer to a resin composition containing a polypropylene resin as its major ingredient. The expanded core layer of the expanded bead according to the present invention is constituted of the resin composition. The resin composition will be also occasionally referred to in the present specification as "base resin".

The mixed resin constituting the cover layer of the expanded bead contains a polypropylene resin (hereinafter occasionally referred to simply as "PP resin") and a polyethylene resin (hereinafter occasionally referred to as "PE resin"). The PP resin forms a continuous phase while the PE resin forms dispersed phases that are dispersed in the continuous phase. Electrically conductive carbon black (hereinafter occasionally referred to as "CB") is unevenly distributed to the dispersed phases side. The weight ratio of the PP resin to the PE resin falls within a specific range and the content of the CB also falls within a specific range.

The expanded beads may be obtained by foaming and expanding composite resin particles (hereinafter occasionally referred to as "resin particles") each having a polypropylene-based resin core layer covered with a mixed resin cover layer containing CB. The polypropylene-based resin core layer of the resin particles turns into the expanded core layer of the expanded beads, while the cover layer of the resin particles turns into the cover layer of the expanded beads. Thus, the CB-containing mixed resin constituting the cover layer of the expanded beads is the same as the CB-containing mixed resin constituting the cover layer of the resin particles. Also, the polypropylene-based resin constituting the expanded core layer of the expanded beads is the same as the polypropylene-based resin constituting the core layer of the resin particles.

The cover layer of the expanded beads is next described. The cover layer may be in an expanded or unexpanded state, but is preferably substantially unexpanded in order to obtain a molded article which exhibits stable electrostatic dissipating properties and a high degree of mechanical strength. The term "substantially unexpanded" used herein is intended to refer not only the case where no cells are formed (including the case where cells once formed in an early stage of the expansion of the resin particles are melted and destroyed in a later stage) but also the case where microcells are present in a small amount to the extent that the mechanical strength of the resulting molded article is not affected.

The expanded core layer of each expanded bead is covered with the cover layer. In this case, it suffices that at least a part of the surface of the expanded core layer be covered with the cover layer. Namely, it does not matter whether the core layer is completely covered with the cover layer or a part of the expanded core layer is exposed, as long as the expanded beads can be fusion bonded to each other. As an example of the structure in which the expanded core layer is partially exposed, there may be mentioned a case in which the expanded core layer has a cylindrical shape and in which only the peripheral surface thereof is covered with the cover layer with its top and bottom surfaces being exposed.

The cover layer contains a mixed resin composed of a PP resin and a PE resin, and CB. The term "PP resin" as used herein refers to a resin containing 50% by weight or more of a propylene component unit. Examples of the PP resin include propylene homopolymers and copolymers of propylene with other olefin(s) copolymerizable therewith. Examples of the olefin copolymerizable with propylene include ethylene and α-olefins having four or more carbon atoms, such as 1-butene. The copolymers may be random copolymers or block copolymers and may be binary copolymers or ternary copolymers. These PP resins may be used singly or as a mixture of two or more thereof.

The term "PE resin" as used herein refers to a resin containing 50% by weight or more, preferably 70% by weight or more, more preferably 80% by weight or more, still more preferably 90% by weight or more, of an ethylene component unit, and may be an ethylene homopolymer or a copolymer of ethylene with an α-olefin(s) having 4 to 6 carbon atoms. Examples of the PE resin include high density polyethylene, low density polyethylene, linear low density polyethylene, very low density polyethylene, and mixtures of two or more thereof.

The CB contained in the cover layer preferably has a dibutyl phthalate (DBP) oil absorption amount of 150 to 700 ml/100 g, more preferably 200 to 600 ml/100 g, even more preferably 300 to 600 ml/100 g. Examples of the CB include acetylene black, furnace black and channel black. The DBP oil absorption amount is measured according to ASTM D2414-79. The CB may be used singly or in combination of two or more thereof. Among these, furnace black is preferred, oil-furnace black is more preferred, and Ketjen black is even more preferred, because a high electrical conductivity can be achieved with the use of a small amount thereof.

In general, when CB is dispersed in a thermoplastic resin such as polypropylene-based resin, electrical conductivity is generated because of the formation of an electrically conductive network structure in which adjacent CB particles are positioned close to each other within a given distance.

In the case of foamed bodies such as expanded beads, the resin is stretched at the time of foaming. Thus, when a CB-containing resin is foamed and expanded, the distance between CB is greater than that before expansion. When a sufficient amount of CB is incorporated in conventional CB-containing, electrically conductive polypropylene-based resin expanded beads, a large number of CB particles are still present close to each other in the polypropylene-based resin even after the resin has been expanded and stretched. As a consequence, the electrically conductive network structure is maintained and, hence, the molded article obtained from the expanded beads exhibits such an electrical conductivity as to provide a surface resistivity lower than $1\times10^4\Omega$.

When the content of CB is reduced with a view toward achieving a medium degree of surface resistivity and obtaining electrostatic dissipating properties, the distance between the CB particles increases. Therefore, the number of CB particles present within the above-mentioned given distance is so small that it is difficult to form an electrically conductive network even before foaming. Thus, as the adding amount of CB decreases, so-called percolation phenomenon occurs and, therefore, the surface resistivity increases significantly.

Additionally, in the case of a molded article of such expanded beads, because the distance between the CB particles further increases as a result of stretching of the resin during the foaming and during the in-mold molding, it becomes more difficult to maintain the electrically conductive network. As a result, a significant change in surface resistivity occurs and, therefore, it is difficult to achieve the electrostatic dissipating properties.

The expanded beads of the present invention, on the other hand, are obtained by foaming and expanding composite resin particles, each having a polypropylene-based resin core layer and a mixed resin cover layer, to such a degree as to provide a specific apparent density range. In the cover layer of the resin particles, there is formed a sea-island structure composed of a PP resin continuous phase and PE resin dispersed phases with CB being distributed unevenly to the dispersed phases side. As a result, in the cover layer of the expanded beads obtained by expanding such resin particles, there is formed a sea-island structure composed of a PP resin continuous phase and PE resin dispersed phases with CB being distributed unevenly to the dispersed phases side. Therefore, by in-mold molding the expanded beads, a molded article having electrostatic dissipating properties is obtained in a stable manner.

The sea-island structure of the resin particles may be formed by the following method. When a PP resin and a PE resin are melted and kneaded together with CB, the CB is primarily present in (distributed unevenly to) the side of the PE resin which has a lower glass transition temperature than that of the PP resin, so that the concentration of the CB in the PE resin phase is higher than that in the PP resin phase. Namely when the above three components are kneaded in such a way that the PE resin is dispersed in the PP resin, namely in such a way as to form a sea phase of the PP resin and island phases of the PE resin, the CB is distributed unevenly to the side of the PE resin dispersed phases that are dispersed in the PP resin continuous phase.

It is believed that the formation of the sea-island structure results in the development of the electrostatic dissipating properties for the following reasons. In the cover layer of the expanded beads, the CB is contained in the PE resin dispersed phases dispersed in the PP resin continuous phase and forms an electrically conductive network in the dispersed phases. Because the CB is restrained in the PE resin, the movement thereof is restricted and the distance between CB particles does not significantly increase when the cover layer is stretched at the time of foaming. It is inferred that, for this reason, the electrically conductive network of the CB in the dispersed phases is maintained, while the volume resistivity of the dispersed phases has such a low value as to show electrical conductivity.

In addition, the PE resin of the present invention has moderate affinity with the PP resin but is not completely compatible therewith. Thus, the PE resin is not considered to be excessively finely dispersed in the continuous phase of the PP resin. Further, the PE resin dispersed phases are considered not to excessively deform following the deformation of the PP resin continuous phase during the foaming. For this reason, the dispersed phases, which themselves show electrical conductivity, can maintain, between them, a distance that is necessary to ensure the desired electrostatic dissipating properties.

Because the expanded beads of the present invention have a composite structure and because the above-described sea-island structure is formed only in the cover layer, the electrostatic dissipating properties are achieved in a stable manner independently from the apparent density (expansion ratio) thereof, in other words, even when the expansion ratio is changed.

The PE resin used in the present invention is preferably an ethylene homopolymer or a copolymer of ethylene with an α-olefin having 4 to 6 carbon atoms. Such a PE resin has especially suitable affinity with the PP resin and, therefore, the electrostatic dissipating properties can be developed in a more stable manner.

Among the above-mentioned PE resins, linear low density polyethylene and high density polyethylene are preferred, and linear low density polyethylene is more preferred. The linear low density polyethylene (PE-LLD) is generally a copolymer of ethylene with an α-olefin such as butene and hexene and has a density of generally 0.88 g/cm$^3$ or higher and lower than 0.94 g/cm$^3$, preferably 0.91 g/cm$^3$ or higher and lower than 0.94 g/cm$^3$. The high density polyethylene (PE-HD) is generally a homopolymer of ethylene or a copolymer of ethylene with butene and has a density of generally 0.94 g/cm$^3$ or higher, preferably 0.94 to 0.97 g/cm$^3$.

The mixing proportion of the PP resin and the PE resin in the mixed resin constituting the cover layer is 99.5:0.5 to 50:50 in terms of weight ratio of the PP resin to the PE resin (PP resin: PE resin). When the proportion of the PE resin is excessively low, the distance between PE resin dispersed phases is increased or a significant amount of CB is present in the PP resin continuous phase. As a result, it is difficult to stably achieve the desired surface resistivity. On the other hand, when the proportion of the PE resin is excessively high, it becomes difficult for the PE resin to form dispersed phases or the distance between the dispersed phases is excessively decreased. As a result, it is also difficult to stably achieve the desired surface resistivity. From this point of view, the weight ratio of the PP resin to the PE resin is preferably 99.5:0.5 to 65:35, more preferably 99.5:0.5 to 70:30, still more preferably 99:1 to 75:25, particularly preferably 99:1 to 80:20, most preferably 98:2 to 85:15.

The mixing proportion of the CB is 5 to 30 parts by weight per 100 parts by weight of the mixed resin composed of the PP resin and the PE resin. When the mixing amount of the CB is outside the above range, it is not possible to obtain the desired surface resistivity in a stable manner. When Ketjen black is used as the CB, the mixing amount thereof is preferably 5 to 15 parts by weight, more preferably 6 to 14 parts by weight, still more preferably 7 to 13 parts by weight, particularly preferably 8 to 12 parts by weight, per 100 parts by weight of the total amount of the PP resin and the PE resin that constitute the base resin, in order to achieve a medium degree of surface resistivity in the range of $1\times10^5$ to $1\times10^{10}\Omega$ in a stable manner. When acetylene black is used as the CB, the mixing amount thereof is preferably 23 to 27 parts by weight, more preferably 24 to 26 parts by weight, per 100 by weight of the total amount of the PP resin and the PE resin that constitute base resin. Ketjen black is more preferred because a desired surface resistivity can be achieved with the addition of a small amount thereof.

The CB typically has an average particle size of 0.01 to 100 μm. From the view point of dispersibility of the CB in the PE resin dispersed phases, the average particle size thereof is preferably 10 to 80 nm, more preferably 15 to 60 nm.

The average particle size of the CB is measured using an electron microscope. Specifically, electron microscope photographs of the CB are taken so that several hundred particles thereof are contained in each field of view. The diameters in a specific direction (Green diameters) of randomly selected 1,000 particles are measured. Then, a number-based cumulative distribution curve is created from the obtained values, and the 50% cumulative diameter in the number-based distribution is adopted as the average particle size.

For reasons of forming the above-described dispersion structure in a stable manner in the present invention, it is preferred that the melting point of the PE resin is in the range of 30 to 150° C. and, at the same time, is lower than that of the PP resin. When the melting point of the PE resin is in the above-described range, the PE resin dispersed phases can sufficiently follow the stretching of the cover layer during expansion stage. As a consequence, an electrically conductive net-work structure between the PE resin dispersed phases may be easily formed.

The melting point (Tm) as used herein is measured by adopting "measurement of melting temperature after the sample has been subjected to specified heat treatment" as described in JIS K7121 (1987) (The heating rate and the cooling rate used in the adjustment of the conditions of the sample are each 10° C./minute). The resulting sample is heated with a DSC device at a heating rate of 10° C./minute for measuring a DSC curve. The peak top temperature of an endothermic peak ascribed to the fusion of the resin is the melting point. When a plurality of endothermic peaks are present in the DSC curve, the peak top temperature of the endothermic peak that has the highest peak height represents the melting point. As the measuring device, there may be used DSCQ1000 manufacture by TA Instruments Inc.

The PE resin preferably has a melt flow rate (MFR) which is 0.001 to 15 times that of the PP resin. The MFR of the PE resin is more preferably 0.001 to 11 times, still more preferably 0.001 to 10 times, that of the PP resin for reasons of formation of the above-described dispersion structure in a stable manner.

The PP resin may be one that has a melt flow rate (MFR) of 0.1 to 30 g/10 min. The MFR of the PP resin is more preferably 2 to 20 g/10 min, still more preferably 3 to 15 g/10 min. The MFR of the PE resin is generally 0.001 to 100 g/10 min, more preferably 0.01 to 90 g/10 min. The MFR of the PE resin and PP resin is measured according to JIS K7210 (1999), test condition M (230° C. and a load of 2.16 kg).

The cover layer of the expanded beads according to the present invention may contain an additional thermoplastic resin or thermoplastic elastomer other than the PP resin and the PE resin to the extent that the intended purpose is not impaired. Examples of the thermoplastic resin include polystyrene-based resins such as polystyrene, impact-resistant polystyrene and styrene-acrylonitrile copolymers, acrylic-based resins such as methyl polymethacrylate, and polyester-based resins such as polylactic acid and polyethylene terephthalate. Examples of the thermoplastic elastomer include olefin-based elastomers such as ethylene-hexene copolymers and ethylene-propylene-diene copolymers, and styrene-based elastomers such as styrene-butadiene-styrene block copolymers, styrene-isoprene-styrene block copolymers, and hydrogenated products thereof.

In addition, the cover layer may further contain additives, such as a catalyst neutralizing agent, a lubricant and a crystal nucleating agent. However, the additives are preferably added in such an amount that the object of the present invention is not impaired and in as small an amount as possible. The using amount of the additives is preferably 15 parts by weight or less, more preferably 10 parts by weight or less, still more preferably 5 parts by weight or less, especially preferably 1 parts by weight or less, based on 100 parts by weight of the total of the base resin, although it depends on the type and the purpose of use of the additives.

The PP resin constituting the cover layer preferably has a melting point lower than that of the polypropylene-based resin constituting the expanded core layer. In the expanded beads having such a constitution, when the expanded beads are heated for in-mold molding to a temperature at which the expanded core layer is fusible, the cover layer is softened earlier than the expanded core layer. As a result, excellent fusion bonding properties between the expanded beads are obtainable. In addition, because the cell structure in the expanded core layer becomes less likely to be damaged during the in-mold molding, it is possible to obtain a molded article which has excellent mechanical properties and does not undergo a significant shrinkage after molding can be obtained.

In addition, when the melting point of the PP resin constituting the cover layer is lower than that of the polypropylene-based resin constituting the expanded core layer, the cover layer is prevented from being in an expanded state. One possible reason why the obtained cover layer is not brought into an expanded state is that, under the conditions under which the composite resin particles are expanded, the relationship between the expandability and viscoelasticity of the resin constituting the cover layer is not suited for maintaining or forming an expanded state. Further, the cover layer is considered to be smoothly extended during the expansion so that the electrostatic dissipating properties thereof can be developed in a stable manner.

From this point of view, it is preferred that the PP resin of the cover layer has a melting point lower than that of the polypropylene-based resin of the expanded core layer by 0 to 80° C., more preferably by 1 to 80° C., more preferably by 5 to 60° C., still more preferably by 10 to 50° C., especially preferably by 15 to 45° C.

Description will be next made of the polypropylene-based resin expanded core layer that constitutes the expanded beads of the present invention. The expanded core layer is formed of a base resin containing a polypropylene-based resin. The polypropylene-based resin may be similar to the PP resin that constitutes the cover layer. Among the PP resins, a polypropylene-ethylene random copolymer, a propylene-butene random copolymer or polypropylene-ethylene-butene random copolymer is preferable used for reasons of good balance between the foam-moldability and mechanical properties.

The expanded core layer of the present invention may contain a thermoplastic resin or thermoplastic elastomer other than the PP resin to the extent that the intended purpose is not impaired. Examples of the thermoplastic resin include polyolefin-based resins such as polyethylene, polystyrene-based resins such as polystyrene, impact-resistant polystyrene and styrene-acrylonitrile copolymers, acrylic-based resins such as methyl polymethacrylate, and polyester-based resins such as polylactic acid and polyethylene terephthalate. Examples of the thermoplastic elastomer include olefin-based elastomers such as ethylene-hexene copolymers and ethylene-propylene-diene copolymers, and styrene-based elastomers such as styrene-butadiene-styrene block copolymers, styrene-isoprene-styrene block copolymers, and hydrogenated products thereof.

In addition, the expanded core layer may contain additives, such as a colorant, a lubricant, a catalyst neutralizing agent and an antioxidant to the extent that the object of the present invention is not impaired. An electrically conductive inorganic substance such as CB may be also added. The adding amount of the additives is preferably 15 parts by weight or less, more preferably 10 parts by weight or less, even more preferably 5 parts by weight or less, especially preferably 1 parts by weight or less, based on 100 parts by weight of the polyolefin-based resin although it depends on the type of the additives.

Because the expanded beads of the expanded beads according to the present invention has a specific cover layer, the resulting molded article exhibits electrostatic dissipating properties even if the expanded core layer does not contain an electrically conductive material of CB. In particular, when the expanded core layer does not contain an electrically conductive material, the expanded beads have excellent expansion moldability and therefore will have a high closed cell content. As a result, an expanded beads molded article obtained therefrom shows only a small contraction after in-mold molding and has high dimensional stability and high productivity. In addition, since the internal pressure in the expanded beads can be increased easily, expanded beads having a low apparent density (high expansion ratio) can be obtained easily.

The weight ratio of the expanded core layer to the cover layer (expanded core layer: cover layer) is preferably 99:1 to 50:50, more preferably 99:1 to 70:30, still more preferably 98:2 to 75:25, especially preferably 96:4 to 80:20 from the standpoint of achievement of stable electrostatic dissipation properties of a surface resistivity of $1\times10^{5}$ to $1\times10^{10}\Omega$ while maintaining proper moldability of the expanded beads and physical properties of the obtained molded article. The weight ratio of the expanded core layer to the cover layer can be adjusted by, for example, adjusting the ratio of the amount of feed of the ingredients of the resin particle core layer to the amount of feed of the ingredients of the resin particle cover layer at the time of production of the composite resin particles as described later.

The cover layer of the expanded beads preferably has an average thickness of 0.2 μm or greater, more preferably 1 μm or greater, still more preferably 3 μm or greater, especially preferably 5 μm or greater in order to achieve more stable electrostatic dissipating properties. The stability of the electrostatic dissipating properties does not increase when the cover layer is excessively thick. For this reason, the upper limit of the average thickness of the cover layer is preferably 200 μm, more preferably 100 μm, still more preferably 50 μm.

In the present invention, the average thickness of the cover layer is calculated based on the weight, apparent density and L(length)/D(diameter) ratio of the expanded beads, the weight proportion of the resin in the resin particle core layer of the composite resin particles before expansion, the density of the cover layer, and so on because the boundary between the expanded core layer and the cover layer is not clear and because the thickness of the cover layer is difficult to measure when it is small. The average thickness of the cover layer of the expanded beads is calculated based on the assumption that the composite resin particles are expanded into expanded beads having a similar shape for simplicity of the calculation.

Specifically, when expanded beads are obtained from cylindrical composite resin particles, the average thickness (Tt) of the cover layer of the expanded beads can be calculated, for example, using the following equations (1) to (3).

$$Pd=\{(4\times W)/(\pi\times Ld\times Db)\}^{(1/3)} \tag{1}$$

wherein Pd represents the diameter (cm) of the cylindrical expanded beads, W represents the weight (g) of the composite resin particles, Db represents the apparent density (g/cm$^3$) of the expanded beads, and Ld represents the L/D ratio of the expanded beads in the case where the composite resin particles are expanded into a similar shape.

$$Cd=\{Pd^2-(4\times R\times W)/(\pi\times Pd\times Ld\times\rho)\}^{(1/2)} \tag{2}$$

wherein Cd represents the diameter (cm) of the core layer of the cylindrical expanded beads, R represents the weight proportion (non-dimensional) of the cover layer in the composite resin particles, and ρ represents the density (g/cm$^3$) of the cover layer.

$$Tt(\mu m)=\{(Pd-Cd)/2\}\times 10000 \tag{3}$$

When the expanded beads are obtained from spherical composite resin particles, the average thickness (Tt) of the cover layer of the expanded beads can be calculated using the equation (5), which is obtained by transforming the equation (4) below.

$$S/\rho=\pi/6\{X\times d^3-X(d-2\times Tt\times 10000)^3\} \tag{4}$$

$$Tt(\mu m)=[-\{(6\times S)/(\rho\times\pi\times X)+d^3\}^{(1/3)}-d]/(-20000) \tag{5}$$

wherein d represents the diameter (cm) of the spherical composite resin particles, S represents the weight (g) of the cover layer of the composite resin particles, X represents the expansion ratio (non-dimensional) of the expanded beads (i.e. (density (g/cm$^3$) of the composite resin particles)/(apparent density Db (g/cm$^3$) of the expanded beads)), and ρ represents the density (g/cm$^3$) of the cover layer.

A desired average thickness of the cover layer of the expanded beads can be achieved by adjusting the weight ratio of the cover layer to the core layer in the composite resin particles, and the L/D ratio and diameter of the composite resin particles based on the desired apparent density (expansion ratio) of the expanded beads.

The expanded beads of the present invention are obtained by expanding the above-described composite resin particles so as to have an apparent density of 10 to 120 kg/m$^3$ and show dielectric dissipating properties in a stable manner. When the apparent density of the expanded beads is excessively low, there is a possibility that the molded article obtained therefrom shows reduced mechanical strength and fails to exhibit dielectric dissipating properties in a stable manner. When the apparent density is excessively high, on the other hand, there is a possibility that the resulting molded article has such an excessively large weight as to deteriorate its light weight property, and also fails to exhibit dielectric dissipating properties in a stable manner. For these reasons, the apparent density of the expanded beads is preferably 12 to 90 kg/m$^3$, more preferably 15 to 60 kg/m$^3$, still more preferably 20 to 50 kg/m$^3$.

The apparent density of the expanded beads may be determined as follows. In a measuring cylinder containing water at 23° C., a group of the expanded beads (weight of the group is W [g]) are immersed using a wire net, etc. From a rise of the water level, the volume V [cm$^3$] of the expanded beads group is determined. The apparent density is calculated by dividing the weight of the expanded beads group by the volume thereof (WN), followed by unit conversion into [kg/cm$^3$].

The expanded beads preferably have an average cell diameter of 20 to 400 μm, more preferably 40 to 200 μm, not only because of excellent in-mold moldability thereof but also because the expanded beads molded article obtained after the molding has good dimension recovery characteristics and excellent mechanical properties such as compressive properties.

As used herein, the average cell diameter of the expanded beads is measured as follows. One expanded bead is cut into nearly equal halves. From an enlarged photo image of the cross section taken by a microscope, the average cell diameter is determined as follows. On the enlarged image of the cross section of the expanded bead, four line segments each passing nearly through the center of the cross section and extending from one surface of the expanded bead to the other surface thereof are drawn such that eight angularly equally spaced straight lines extend radially from nearly the center of the cross section toward the external surface of the expanded bead. A total number (N) of cells that intersect the above four line segments is counted. Also measured is a total length (L(μm)) of the four line segments. The value (L/N) obtained by dividing the total length L by the total number N is an average cell diameter of the expanded bead. Similar procedures are repeated for 10 expanded beads in total. The arithmetic mean of the average cell diameters of the ten expanded beads represents the average cell diameter of the expanded beads.

The expanded beads preferably have a closed cell content of 75% or more, more preferably 80% or more, still more preferably 82% or more. When the closed cell content is within the above range, the expanded beads show sufficiently high secondary expansion property and easily give an expanded beads molded article having excellent mechanical properties.

As used herein, the closed cell content of the expanded beads is measured as follows. The expanded beads are allowed to stand for 10 days for aging in a thermostatic chamber at 23° C. under atmospheric pressure and a relative humidity of 50%. In the same thermostatic chamber, about 20 cm$^3$ bulk volume of the expanded beads thus aged are sampled and measured for the precise apparent volume Va by a water immersion method. The sample whose apparent volume Va has been measured is fully dried and measured for its true volume Vx according to Procedure C of ASTM D-2856-70 using Air Comparison Pycnometer Type-930 manufactured by Toshiba Beckman Inc. From the volumes Va and Vx, the closed cell content is calculated by the formula (6). The arithmetic mean of the 5 measured values is the closed cell content of the expanded beads (N=5).

$$\text{Closed cell content}(\%)=(Vx-W/\rho)\times100/(Va-W/\rho) \quad (6)$$

wherein

Vx represents the true volume (cm$^3$) of the expanded beads measured by the above method, which corresponds to a sum of a volume of the resin constituting the expanded beads and a total volume of all the closed cells in the expanded beads, Va represents an apparent volume (cm$^3$) of the expanded beads, which is measured by a rise of the water level when the expanded beads are immersed in water contained in a measuring cylinder, W is a weight (g) of the sample expanded beads used for the measurement; and ρ is a density (g/cm$^3$) of the resin constituting the expanded beads.

It is also preferred that the expanded beads of the present invention have secondary crystals and that the heat of fusion of the secondary crystals as measured by differential thermal analysis is 1 to 30 J/g. Namely, it is preferred that the expanded beads, when measured by heat flux differential scanning calorimetry in which 2 to 10 mg thereof are heated from 23° C. to 220° C. at a heating rate of 10° C./min, give a DSC curve (first heating run DSC curve) having an endothermic peak "A" which is intrinsic to the polypropylene-based resin (hereinafter occasionally referred to simply as "intrinsic peak") and one or more endothermic peaks "B" (hereinafter occasionally referred to simply as "high temperature peak") which are located on a higher temperature side of the intrinsic peak and that the heat of fusion of the high temperature peak (hereinafter occasionally referred to as "high temperature peak calorific value") is 1 to 30 J/g. When the high temperature peak calorific value is within the above range, the expanded beads show excellent fusion bonding properties and can give an expanded beads molded article having excellent mechanical properties.

The upper limit of the high temperature peak calorific value is preferably 18 J/g, more preferably 17 J/g, still more preferably 16 J/g, while the lower limit thereof is preferably 4 J/g. Incidentally, the high temperature peak of the expanded beads may be controlled by any known manner. One controlling method is disclosed in, for example, Japanese Patent Publication No. JP-A-2001-151928.

As used herein, the first heating run DSC curve, calorific value of the intrinsic peak and high temperature peak calorific value are measured by a measuring method according to JIS K7122 (1987) as follows.

Figure 4:
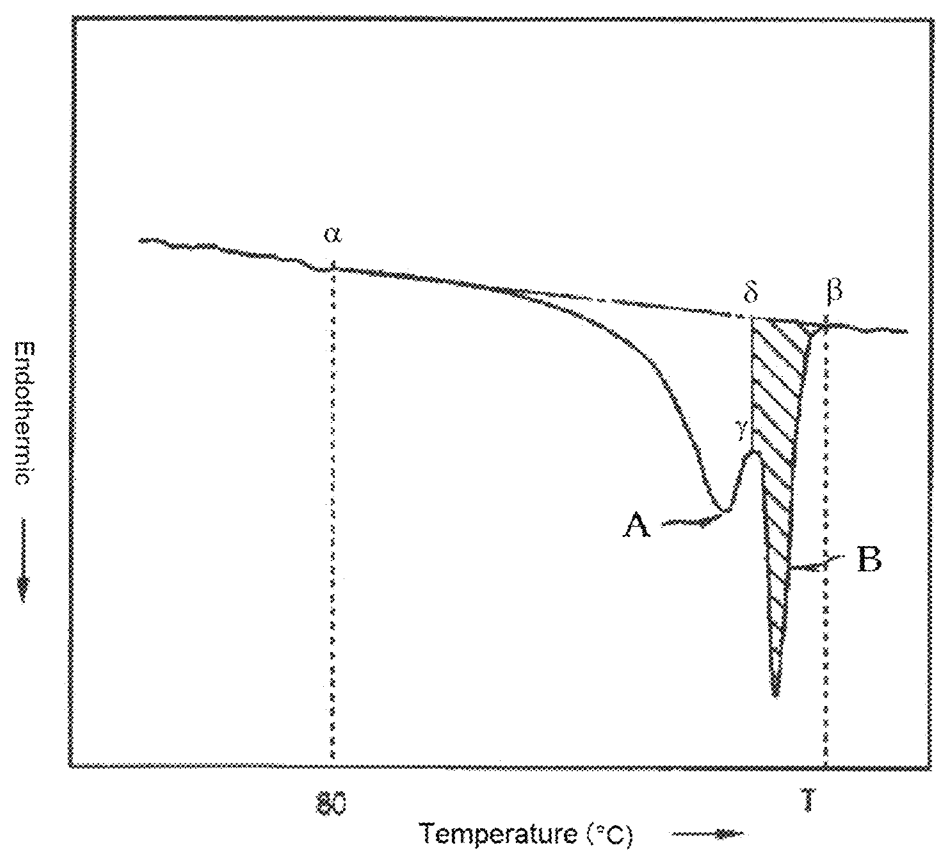
FIG. 4 is a diagram showing an example of a first heating run DSC curve.

Expanded bead(s) (2 to 10 mg) are sampled and heated using a differential scanning calorimeter from 23° C. to 220° C. at a heating rate of 10° C./minute to obtain a first heating run DSC curve an example of which is shown in FIG. 4.

The DSC curve shown in FIG. 4 has an intrinsic peak "A" attributed to the polypropylene-based resin forming the expanded beads and a high temperature peak "B" located on a high temperature side of the intrinsic peak. The quantity of heat of the high temperature peak "B" corresponds to the area of the peak and is determined in the manner specifically described below. First, a straight line (α–β) extending between a point α on the DSC curve at 80° C. and a point β on the DSC curve at a melting completion temperature T of the expanded beads is drawn. The melting completion temperature T is a temperature of an intersection at which the DSC curve on a high temperature side of the high temperature peak "B" meets the base line. Next, a line which is parallel with the ordinate and which passes a point γ on the DSC curve at the bottom of the valley between the intrinsic peak "A" and the high temperature peak "B" is drawn. This line crosses the line (α-β) at a point δ. The area of the high temperature peak "B" is the area (hatched portion in FIG. 4) bounded by the curve of the high temperature peak "B", the line segment (δ-β) and the line segment (γ-δ), and corresponds to the high temperature peak calorific value.

Incidentally, the high-temperature peak(s) "B" appears in the DSC curve measured in the first heating run as described above, but does not appear in the DSC curve obtained during heating in the second heating run. In the second heating run DSC curve, only the endothermic peak inherent to the polypropylene-based resin forming the expanded beads is present.

Description will be next made of a method for producing the polypropylene-based resin expanded beads of the present invention. The expanded beads of the present invention may be obtained by expanding composite resin particles each having a polypropylene-based resin particle core layer and a CB-containing mixed resin cover layer which covers the core layer.

The composite resin particles used in the present invention may be obtained as follows. A device having two extruders, i.e. an extruder for forming a resin particle core layer and an extruder for forming a resin particle cover layer, which are connected to a coextrusion die, is used. A required polypropylene-based resin and, if needed, additives such as a cell controlling agent are fed to the extruder for forming a resin particle core layer and melted and kneaded to obtain a molten resin for forming the resin particle core layer. On the other hand, required PP resin, PE resin and CB are fed to the extruder for forming a resin particle cover layer, and melted and kneaded to obtain a molten resin for forming the resin particle cover layer. The molten resin for forming the resin particle core layer is fed into a coextrusion die to form a linear flow. At the same time, the molten resin for forming the resin particle cover layer is fed into the coextrusion die so that the linear flow of the molten resin for forming the resin particle core layer is surrounded by and laminated with the molten resin for forming the resin particle cover layer, thereby forming a molten resin composition that has a core-sheath structure. The molten resin composition is then extruded, in the form of a plurality of strands, through small holes of a mouthpiece attached to an exit at a tip of the extruder. Composite resin particles may be obtained by a method, for example, by cutting the strands into suitable lengths after having been passed through water or by simultaneously cutting and cooling the strands as soon as the molten resin composition has been extruded through the die into water. In the present specification, the composite structure thus formed is occasionally referred to as "core-sheath" structure.

The method for producing composite resin particles using the above-described coextrusion die is disclosed in detail in, for example, Japanese Examined Patent Publications Nos. JP-S41-16125, JP-S43-23858 and JP-S44-29522 and Japanese Unexamined Patent Publication No. JP-A-S60-185816.

In the cover layer which constitutes the expanded beads of the present invention, it is important that the PP resin should form a continuous phase, that the PE resin should form dispersed phases which are dispersed in the continuous phase, and that the CB should be contained in the PE resin. Therefore, it is necessary to prepare the composite resin particles in such a way that the above structure is formed in the resin particle cover layer. To form such a structure, it is preferred that a master batch in which the CB is dispersed in the PP resin is previously prepared and the resulting master batch, the PE resin and, if necessary an additional amount of the PP resin are fed to and kneaded in the extruder, although the PP resin, PE resin and CB can be fed directly to and kneaded in the extruder for forming the cover layer.

The concentration of the CB in the master batch is preferably 5 to 50% by weight, more preferably 8 to 30% by weight, still more preferably 9 to 25% by weight. The master batch is preferably added with an olefin-based elastomer in order to improve dispersibility of CB in the master batch. The addition amount of the olefin-based elastomer is preferably 3 to 10% by weight. Examples of the olefin elastomer include an ethylene-octene copolymerized elastomer and an ethylene-propylene-diene copolymerized elastomer.

In order to control the cell diameter of the expanded core layer, it is preferred that a cell controlling agent is added into the resin particle core layer. As the cell controlling agent, there may be mentioned an inorganic powder such as talc, calcium carbonate, borax, zinc borate, aluminum hydroxide and alum. The cell controlling agent is preferably used in an amount of 0.001 to 10 parts by weight, more preferably 0.01 to 5 parts by weight, per 100 parts by weight of the base resin. Although the cell controlling agent may be added as such into the base resin of the resin particle core layer, it is preferred that the cell controlling agent is added in the form of a master batch for reasons of improved dispersion efficiency.

The composite resin particles each preferably have a weight of 0.02 to 20 mg, more preferably 0.1 to 6 mg, since the expanded beads can be uniformly filled in a mold cavity.

The expanded beads of the present invention may be prepared from the above-described composite resin particles by, for example, so-called dispersing medium releasing foaming method. In this method, the composite resin particles are dispersed in a dispersing medium, such as water, contained in a closed vessel such as autoclave together with a physical blowing agent, etc. The dispersing medium is then heated to a temperature not lower than the softening point of the resin particles to impregnate the resin particles with the blowing agent. Then, while maintaining the pressure inside the closed vessel at a pressure not lower than the vapor pressure of the blowing agent, an end portion of the closed vessel, that is located beneath the water level, is opened to release the blowing agent-impregnated expandable resin particles together with the dispersing medium such as water from the closed vessel to an atmosphere which is maintained at a pressure lower than that in the closed vessel, generally atmospheric pressure, to foam and expand the resin particles, thereby obtaining the expanded beads of the present invention. In an alternative method, the blowing agent-impregnated expandable resin particles are taken out of the closed vessel and heated with a suitable heating medium such steam to foam and expand the resin particles.

In a further alternative, preparation of the composite resin particles in the above extrusion device may be modified such that a blowing agent is injected into an extruder for forming the core layer to obtain a foamable molten resin composition. The foamable molten resin composition is laminated with the above-described molten resin for forming the cover layer to obtain a melt stream having a sheath-core structure. By extruding the melt stream having a sheath-core structure through a die, the extrudate expands and foams.

The release of the composite resin particles from a higher pressure zone in which no expansion thereof takes place to a lower pressure zone in which the expansion thereof takes place is preferably performed such that a difference in pressure therebetween is generally at least 400 kPa, preferably 500 to 15,000 kPa.

The blowing agent used in the dispersing medium release foaming method is generally an organic physical blowing agent such as propane, isobutane, normal butane, isopentane, normal pentane, cyclopentane, normal hexane, cyclobutane, cyclohexane, chlorofluoromethane, trifluoromethane, 1,1,1,2-tetrafluoroethane, 1-chloro-1,1-difluoroethane, 1,1-difluoroethane and 1-chloro-1,2,2,2-tetrafluoroethane, or an inorganic physical blowing agent such as nitrogen, carbon dioxide, argon and air. For reasons of freedom of destruction of the ozone layer and low costs, the use of inorganic physical blowing agent, especially nitrogen, air and carbon dioxide is preferred. The above blowing agents may be used in combination of two or more thereof.

The amount of the blowing agent is determined as appropriate in view of relationship between the intended apparent density of the expanded beads and the foaming temperature. More specifically, the blowing agent other than nitrogen and air is generally used in an amount of 2 to 50 parts by weight per 100 parts by weight of the resin particles. In the case of nitrogen and air, the blowing agent is used in an amount so that the pressure within the closed vessel is in the range of 1 to 7 MPa(G).

As the dispersing medium for dispersing the resin particles in the closed vessel, water is preferred. However, other media, such as ethylene glycol, glycerin, methanol and ethanol, may be used as long as the resin particles are not dissolved therein.

The average cell diameter may be controlled by adjustment of the kind and amount of the blowing agent, the expansion temperature and the amount of the cell controlling agent. The apparent density (expansion ratio) may be controlled by adjustment of the kind of the blowing agent, the expansion temperature and the above-described difference in pressure at the time of the foaming. The apparent density of the expanded beads is generally smaller with an increase of the amount of the blowing agent, the expansion temperature and the pressure difference.

A melt-adhesion preventing agent may be used for the purpose of preventing the resin particles from melt-adhering to each other during heating of the dispersion of the base resin particles in the dispersing medium to the foaming temperature. Any inorganic and organic substance may be used as the melt-adhesion preventing agent, as long as they are insoluble in water, etc. and are not fused upon being heated. Inorganic substances are generally preferred.

Examples of the inorganic melt-adhesion preventing agent include powders of kaolin, talc, mica, aluminum oxide, titanium oxide and aluminum hydroxide. The melt-adhesion preventing agent preferably has an average particle diameter of 0.001 to 100 μm, more preferably 0.001 to 30 μm and is preferably used in an amount of 0.01 to 10 parts by weight per 100 parts by weight of the resin particles.

A dispersing aid such as an anionic surfactant, e.g. sodium dodecylbenzenesulonate and sodium oleate, and aluminum sulfate may be suitably used. The dispersing aid is preferably added in an amount of 0.001 to 5 parts by eight per 100 parts by weight of the resin particles.

When low apparent density expanded beads are to be produced, it is desirable to conduct so-called two-step expansion in which expanded beads are produced by the above-described dispersing medium releasing foaming method or the like method, the obtained expanded beads being thereafter subjected to a further expansion treatment. In the two-step expansion method, the expanded beads obtained are charged in a pressure resistant closed vessel and are subjected to a pressurizing treatment using a gas such as air so that the inner pressure in the expanded beads is increased to 0.01 to 0.6 MPa(G). The resulting expanded beads are then taken out of the closed vessel and heated with a heating medium such as steam thereby to obtain expanded beads having a lowered apparent density.

The molded article according to the present invention may be produced by filling the above-described expanded beads in a mold cavity and heating the expanded beads with steam for molding by customarily known method as needed. More specifically, the expanded beads are filled in a mold cavity which can be closed but not airtightly. Thereafter steam is fed into the mold cavity to heat and expand the expanded beads and to fusion bond the expanded beads to each other, thereby obtaining the molded article having a shape conforming to the mold cavity. If desired, the expanded beads may be subjected to a pressurizing treatment to increase the inside pressure of the expanded beads to 0.01 to 0.2 MPa(G) in the same manner as that of the step of the above-described two-step expansion.

After the molding by fusion bonding of the expanded beads has been completed, the molded article may be cooled within the mold cavity. The cooling may be carried out by a water cooling method. The cooling may be also carried out by a vacuum method in which the cooling is performed by utilizing the heat of vaporization of steam.

The desired molded article may be also obtained by a method in which the expanded beads are compressively filled in the mold cavity with a compression ratio of 4 to 25 volume %, more preferably 5 to 20 volume %, and then in-mold molded with steam.

The compression ratio can be controlled by charging the expanded beads in the mold cavity in an amount greater than the inside volume of the mold cavity. When expanded beads are filled in a mold cavity, there may be adopted a filling method in a cracking mode, in which, at the time of the filling of the expanded beads into the mold cavity, the mold is not in a fully closed state for the purpose of discharging air in the mold cavity out of the mold and of efficiently filling the expanded beads in the mold cavity. The "cracking" refers to an opened portion of the mold. The cracking is finally fully closed after completion of the filling of the expanded beads so that the expanded beads are compressed before steam is fed into the mold cavity.

The molded article of the present invention preferably has a closed cell content of 75% or more, more preferably 80% or more, still more preferably 82% or more, particularly preferably 85% or more. When the closed cell content is within the above range, the molded article has good mechanical properties.

The closed cell content of the molded article is measured as follows. The molded article is allowed to stand, for aging, for 10 days in a thermostatic chamber at 23° C. under atmospheric pressure and a relative humidity of 50%. A sample with a size of 25×25×20 mm is cut out from the aged molded article and measured for its closed cell content in the same manner as that for the above-described measurement of the closed cell content of the expanded beads.

The molded article of the present invention has a surface resistivity of $1\times10^5$ to $1\times10^{10}\Omega$, preferably $1\times10^6$ to $1\times10^9\Omega$, and, hence, exhibits stable electrostatic dissipative property. For this reason, the molded article can be suitably used as packaging materials for electronic parts such as integrated circuits and hard disks. As used herein the surface resistivity is a value as measured according to JIS C2170 (2004), Paragraph 8, "Measurement of resistance of static dissipative material (used to prevention of accumulation of electrostatic charge)".

EXAMPLES

The present invention will be next described in further detail by way of examples. It is to be noted that the present invention is not limited to the examples.

The kinds and physical properties of the polypropylene-based resins used in the examples and comparative examples are shown in Table 1, the kinds and physical properties of the polyethylene resins are shown in Table 2, the kinds and physical properties of CB are shown in Table 3, and the kinds and physical properties of the olefin-based elastomers are shown in Table 4.

TABLE 1

| | Abbreviation | PP1 | PP2 |
|---|---|---|---|
| PP resin | Kind of resin | Ethylene-propylene random copolymer | Ethylene-propylene random copolymer |
| | Ethylene content (%) | 3.6 | 2.8 |
| | Melting point (° C.) | 136 | 143 |
| | Glass transition temperature (° C.) | 3 | 3 |
| | MFR (g/10 min) | 8.2 | 5.1 |

TABLE 2

| | Abbreviation | PE1 | PE2 | PE3 | PE4 | PE5 |
|---|---|---|---|---|---|---|
| PE resin | Kind of resin | LLDPE | HDPE | LLDPE | LDPE | LLDPE |
| | Kind of comonomer | 1-hexene | — | 1-hexene | — | 1-butene |
| | Carbon number of comonomer | C6 | — | C6 | — | C4 |
| | Density of resin ($g/cm^3$) | 0.91 | 0.95 | 0.88 | 0.92 | 0.93 |
| | Melting point (° C.) | 102 | 131 | 59 | 121 | 123 |
| | Glass transition temperature (° C.) | <−70 | <−70 | <−70 | <−70 | <−70 |
| | MFR(g/10 min) | 2.2 | 0.01 | 4.6 | 2.4 | 90 |

In above Table, "LLDPE" means linear low density polyethylene; "HDPE" means high density polyethylene; and "LDPE" means low density polyethylene; the containing of 1-butene as a comonomer means that the resin is an ethylene-butene copolymer; the containing of 1-hexene as a comonomer means that the resin is an ethylene-hexene copolymer;

and "-" means that the polyethylene-based resin does not contain a comonomer, namely the resin is an ethylene homopolymer.

TABLE 3

| | Abbreviation | CB1 | CB2 |
|---|---|---|---|
| CB | Kind (production method) | Oil furnace black | Acetylene black |
| | Product name | Ketjen Black EC300J | Toka Black #5500 |
| | DBP oil absorption amount ($cm^3$/100 g) | 360 | 155 |
| | Particle size (nm) | 40 | 25 |

TABLE 4

| | Abbreviation | EO1 |
|---|---|---|
| Olefin-based elastomer | Kind of resin | Ethylene-octene copolymerized elastomer |
| | Comonomer | C8 |
| | Density of resin ($g/cm^3$) | 0.87 |
| | Melting point (° C.) | 59 |
| | Glass transition temperature (° C.) | <−70 |
| | MFR(g/10 min) *1 | 10.0 |

In above Table, "C8" means that the olefin-based elastomer contains 1-octene as a comonomer, namely the resin is an ethylene-octene copolymerized elastomer.

Examples 1 to 15 and Comparative Examples 1 to 7

Preparation of CB Master Batch

MB1:

To a twin screw extruder having an inside diameter of 30 mm, 80 parts by weight of PP1 shown in Table 1 as PP resin, 15 parts by weight of CB1 shown in Table 3 as CB and 5 parts by weight of EO1 shown in Table 4 as an olefin-based elastomer were fed and melted and kneaded at 200 to 220° C. The kneaded mass was extruded into strands. The strands were cooled and cut to obtain a CB master batch MB1.

MB2:

To a twin screw extruder having an inside diameter of 30 mm, 85 parts by weight of PP1 shown in Table 1 as a PP resin and 15 parts by weight of CB1 shown in Table 3 as CB were fed and melted and kneaded at 200 to 220° C. The kneaded mass was extruded into strands. The strands were cooled and cut to obtain a CB master batch MB2.

MB3:

To a twin screw extruder having an inside diameter of 30 mm, 70 parts by weight of PP1 shown in Table 1 as a PP resin and 30 parts by weight of CB2 shown in Table 3 as CB were fed and melted and kneaded at 200 to 220° C. The kneaded mass was extruded into strands. The strands were cut to obtain a CB master batch MB3.

MB4:

To a twin screw extruder having an inside diameter of 30 mm, 55 parts by weight of PP2 shown in Table 1 as a PP resin and 45 parts by weight of a carbon black colorant (Product Name: #650B) were fed and melted and kneaded at 200 to 220° C. The kneaded mass was extruded into strands. The strands were cut to obtain a master batch MB4 for coloring.

Preparation of Electrically Conductive Resin Pellets:

In Examples 1 to 15, a PP resin, a PE resin and a CB master batch were fed to a twin screw extruder having an inside diameter of 30 mm, such that the kinds and amounts of the PP resin, PE resin, CB and olefin-based elastomer were as shown in Tables 5 and 6. In the extruder, they were heated, melted and kneaded at a determined temperature of 200 to 220° C. The kneaded mass was extruded into strands. The strands were cooled with water and cut with a pelletizer to obtain electrically conductive resin pellets for forming a resin particle cover layer. As the CB master batch, MB1 was used in the examples other than Examples 6 and 9, MB2 was used in Example 6 and MB3 was used in Example 9.

In Comparative Examples 1 to 3, a PP resin and a CB master batch were fed to a twin screw extruder having an inside diameter of 30 mm, so that the kinds and amounts of the PP resin and CB were as shown in Table 7. In the extruder, they were heated, melted and kneaded at a determined temperature of 200 to 220° C. The kneaded mass was extruded into strands. The strands were cooled with water and cut with a pelletizer to obtain electrically conductive resin pellets for forming a resin particle cover layer. As the CB master batch, MB2 was used in the Comparative Examples 1 and 2, and MB3 was used in Comparative Example 3.

In Comparative Examples 4 to 7, a PP resin, CB master batch MB1 and EO1 as an olefin-based elastomer were fed to a twin screw extruder having an inside diameter of 30 mm, such that the kinds and amounts of the PP resin, CB and olefin-based elastomer were as shown in Table 6. In the extruder, they were heated, melted and kneaded at a determined temperature of 200 to 220° C. The kneaded mass was extruded into strands. The strands were cut with a pelletizer to obtain electrically conductive resin pellets for forming a resin particle cover layer. The olefin-based elastomer is referred to in Tables 5 to 7 simply as elastomer.

Preparation of Resin Particles:

An extrusion device having an extruder for forming a resin particle core layer (inside diameter: 65 mm), an extruder for forming a resin particle cover layer (inside diameter: 30 mm) and a coextrusion die for forming multi-layer strands which was attached to exits of the extruders was used. The PP resin (the kind of which is shown in Tables 5 to 7) as a polypropylene-based resin was fed to the extruder with an inside diameter of 65 mm for forming a resin particle core layer, while the above-described electrically conductive resin pellets were fed to the extruder with an inside diameter of 30 mm for forming a resin particle cover layer. The materials thus fed were each heated, melted and kneaded at a determined temperature of 200 to 220° C. and thereafter introduced into the coextrusion die and combined. The combined stream was then coextruded in the form of multi-layer strands, in which the peripheral surface of each core layer is covered with an outer layer, through small holes of a mouthpiece attached to a die exit of the extruder. The coextruded strands were cooled with water and cut with a pelletizer into columnar composite resin particles each having a weight of 2 mg, an L/D ratio of 2.4 and a two-layer (core-sheath) structure.

The weight and L/D herein are each arithmetic mean value of randomly selected 100 composite resin particles. Into the polypropylene-based resin feed for forming the resin particle core layer, zinc borate as a cell controlling agent was added in an amount so that the content of the zinc borate in the resin particle core layer was 1,000 ppm by weight, and MB4 was also added as the black colorant in an amount 7 parts by weight per 100 parts by weight of the polypropylene-based resin.

Preparation of Expanded Beads:

The thus obtained composite resin particles (1 kg) were charged in a 5 L autoclave together with 3 L of water as a dispersing medium, to which 3 g of kaolin as a dispersing agent, 0.04 g of sodium alkylbenzenesulfonate and 0.1 g of aluminum sulfate as a dispersing aid were added. Carbon dioxide as a blowing agent was then injected into the autoclave in an amount so that the inside pressure of the autoclave was as shown in Tables 5 to 7. The contents were heated with stirring to a foaming temperature and maintained at the foaming temperature for 15 minutes to adjust the high temperature peak calorific value. Thereafter, the contents in the autoclave were released to atmospheric pressure together with water to obtain expanded beads.

Preparation of Two-step Expanded Beads:

In Examples 4 and 5 and Comparative Examples 5 to 7, the expanded beads obtained above were subjected to a two-step expansion treatment to obtain low apparent density expanded beads. Namely, the obtained expanded beads were placed in a closed vessel adapted for pressurizing the expanded beads and pressurized with air so that the inside pressure of the expanded beads was increased to 0.5 MPa(G). The resulting expanded beads were then taken out of the closed vessel and heated with steam.

Production of Molded Articles:

The above obtained expanded beads were placed in a mold cavity adapted for forming a flat plate having a length of 250 mm, a width of 200 mm and a thickness of 50 mm, and subjected to in-mold molding by steam heating to obtain plate-like foamed molded articles. The heating was performed in such a way that steam was fed for 5 seconds for preheating (air purging step) while maintaining drain valves on both side molds in an open state and, thereafter, one-direction flow heating was carried out at a pressure lower by 0.04 MPa(G) than that for full heating. Then, reversed one-direction flow heating was performed at a pressure lower by 0.02 MPa(G) than that for the full heating. Finally, the full heating was performed at a molding heated steam pressure (molding pressure) shown in Tables 5 to 7. The molding pressure was a critical pressure at which the molded article has the highest fusion bonding without significant shrinkage. When the pressure was higher than the critical pressure, the molded article showed either significant shrinkage or reduced fusion bonding property and, hence, was not the desired molded article. After completion of the heating, the pressure was released and was cooled with water until its surface pressure attributed to its expansion force decreased to 0.04 MPa(G). The mold was then opened. The molded article was taken out of the mold cavity and aged in an oven at 80° C. for 12 hours, thereby obtaining the expanded beads molded article having physical properties shown in Tables 5 to 7. In Tables 5 to 7, "*1" shows that the measurement results are at 23° C. and 10% RH (Environment Condition 1) while "*2" shows that the measurement results are at 23° C. and 50% RH (Environment Condition 2).

TABLE 5

| Example | | | | | 1 | 2 | 3 | 4 |
|---|---|---|---|---|---|---|---|---|
| Resin Particles | Cover layer | Raw resin | PP resin | Kind | PP1 | PP1 | PP1 | PP1 |
| | | | | wt % | 94 | 94 | 94 | 94 |
| | | | PE resin | Kind | PE1 | PE1 | PE1 | PE1 |
| | | | | wt % | 6 | 6 | 6 | 6 |
| | | | CB | Kind | CB1 | CB1 | CB1 | CB1 |
| | | | | Part by wt. | 10 | 10 | 10 | 10 |
| | | | Elastomer | Kind | EO1 | EO1 | EO1 | EO1 |
| | | | | Part by wt. | 3 | 3 | 3 | 3 |
| | | Proportion | | wt % | 10 | 5 | 15 | 10 |
| | Core layer | Raw resin | Polypropylene resin | Kind | PP2 | PP2 | PP2 | PP2 |
| | | Proportion | | wt % | 90 | 95 | 85 | 90 |
| | Surface resistivity *1 | | | Ω | $1.3 \times 10^2$ | $1.3 \times 10^2$ | $1.3 \times 10^2$ | $1.3 \times 10^2$ |
| Expanded Beads | Foaming conditions | Blowing agent | | — | $CO_2$ | $CO_2$ | $CO_2$ | $CO_2$ |
| | | Vessel inside pressure | | MPa(G) | 3.75 | 3.75 | 3.75 | 3.75 |
| | | Foaming temperature | | ° C. | 149.5 | 149.5 | 149.5 | 149.5 |
| | | Two step expansion | | — | no | no | no | yes |
| | Physical properites | Apparent density | | kg/m$^3$ | 71.4 | 75.6 | 67.7 | 30.5 |
| | | Average cell diameter | | μm | 190 | 200 | 210 | 220 |
| | | Cover layer thickness | | μm | 7 | 3 | 10 | 2 |
| | | High temperature peak calorific value | | J/g | 17.7 | 17.9 | 17.7 | 16.5 |
| Molded Article | Molding conditions | Applied inside pressure | | MPa(G) | 0 | 0 | 0 | 0.12 |
| | | Molding pressure | | MPa(G) | 0.36 | 0.36 | 0.36 | 0.22 |
| | Physical properties | Fusion bonding | | — | ○ | ○ | ○ | ○ |
| | | Apparent density | | kg/m$^3$ | 50.8 | 54.2 | 52.6 | 21.6 |
| | | 50% Compressive strength | | kPa | 461 | 500 | 481 | 164 |
| | | Shrinkage | | ‰ | 18 | 20 | 20 | 20 |
| | | Closed cell content | | % | 88 | 88 | 88 | 88 |
| | | Surface resistivity *1 | | Ω | $1.8 \times 10^6$ | $2.9 \times 10^6$ | $5.6 \times 10^6$ | $2.5 \times 10^6$ |
| | | Surface resistivity *2 | | Ω | $1.9 \times 10^6$ | $2.7 \times 10^6$ | $5.6 \times 10^6$ | $2.2 \times 10^6$ |
| | | Charge decay *1 | | — | ○ | ○ | ○ | ○ |
| | | Charge decay *2 | | — | ○ | ○ | ○ | ○ |
| Example | | | | | 5 | 6 | 7 | 8 |
| Resin Particles | Cover layer | Raw resin | PP resin | Kind | PP1 | PP1 | PP1 | PP1 |
| | | | | wt % | 94 | 99 | 89 | 89 |
| | | | PE resin | Kind | PE1 | PE1 | PE1 | PE1 |
| | | | | wt % | 6 | 1 | 11 | 11 |

TABLE 5-continued

| | | | | | | | | |
|---|---|---|---|---|---|---|---|---|
| | | | CB | Kind | CB1 | CB1 | CB1 | CB1 |
| | | | | Part by wt. | 10 | 10 | 8 | 12 |
| | | | Elastomer | Kind | EO1 | — | EO1 | EO1 |
| | | | | Part by wt. | 3 | 0 | 3 | 3 |
| | | | Proportion | wt % | 10 | 10 | 10 | 10 |
| | | Core layer | Raw resin Polypropylene resin | Kind | PP2 | PP2 | PP2 | PP2 |
| | | | Proportion | wt % | 90 | 90 | 90 | 90 |
| | | Surface resistivity *1 | | Ω | $1.3 \times 10^2$ | $1.5 \times 10^2$ | $1.5 \times 10^2$ | $1.2 \times 10^2$ |
| Expanded Beads | Foaming conditions | Blowing agent | | — | $CO_2$ | $CO_2$ | $CO_2$ | $CO_2$ |
| | | Vessel inside pressure | | MPa(G) | 3.75 | 3.75 | 3.80 | 3.80 |
| | | Foaming temperature | | ° C. | 149.5 | 149.5 | 151.5 | 151.5 |
| | | Two step expansion | | — | yes | no | no | no |
| | Physical properties | Apparent density | | kg/m³ | 18.0 | 64.7 | 95.7 | 95.7 |
| | | Average cell diameter | | μm | 220 | 190 | 200 | 190 |
| | | Cover layer thickness | | μm | 1 | 7 | 7 | 7 |
| | | High temperature peak calorific value | | J/g | 16.1 | 16.3 | 10.5 | 9.1 |
| Molded Article | Molding conditions | Applied inside pressure | | MPa(G) | 0.12 | 0 | 0 | 0 |
| | | Molding pressure | | MPa(G) | 0.22 | 0.32 | 0.24 | 0.24 |
| | Physical properties | Fusion bonding | | — | ○ | ○ | ○ | ○ |
| | | Apparent density | | kg/m³ | 16.1 | 47.1 | 35.6 | 35.3 |
| | | 50% Compressive strength | | kPa | 118 | 418 | 295 | 292 |
| | | Shrinkage | | ‰ | 32 | 18 | 18 | 20 |
| | | Closed cell content | | % | 88 | 88 | 88 | 88 |
| | | Surface resistivity *1 | | Ω | $2.9 \times 10^6$ | $6.5 \times 10^6$ | $2.7 \times 10^9$ | $1.1 \times 10^5$ |
| | | Surface resistivity *2 | | Ω | $2.9 \times 10^6$ | $6.8 \times 10^6$ | $2.6 \times 10^9$ | $1.3 \times 10^5$ |
| | | Charge decay *1 | | — | ○ | ○ | ○ | ○ |
| | | Charge decay *2 | | — | ○ | ○ | ○ | ○ |

TABLE 6

| Example | | | | | 9 | 10 | 11 | 12 |
|---|---|---|---|---|---|---|---|---|
| Resin Particles | | Cover layer | Raw resin PP resin | Kind | PP1 | PP1 | PP1 | PP1 |
| | | | | wt % | 89 | 83 | 66 | 94 |
| | | | PE resin | Kind | PE1 | PE1 | PE1 | PE2 |
| | | | | wt % | 11 | 17 | 34.0 | 6 |
| | | | CB | Kind | CB2 | CB1 | CB1 | CB1 |
| | | | | Part by wt. | 24 | 10 | 10 | 10 |
| | | | Elastomer | Kind | — | EO1 | EO1 | EO1 |
| | | | | Part by wt. | 0 | 3 | 3 | 3 |
| | | | Proportion | wt % | 10 | 10 | 10 | 10 |
| | | Core layer | Raw resin Polypropylene resin | Kind | PP2 | PP2 | PP2 | PP2 |
| | | | Proportion | wt % | 90 | 90 | 90 | 90 |
| | | Surface resistivity *1 | | Ω | $1.3 \times 10^2$ | $1.4 \times 10^2$ | $1.3 \times 10^2$ | $9.4 \times 10^1$ |
| Expanded Beads | Foaming conditions | Blowing agent | | — | $CO_2$ | $CO_2$ | $CO_2$ | $CO_2$ |
| | | Vessel inside pressure | | MPa(G) | 3.80 | 3.80 | 3.75 | 3.75 |
| | | Foaming temperature | | ° C. | 151.5 | 151.5 | 149.5 | 149.5 |
| | | Two step expansion | | — | no | no | no | no |
| | Physical properties | Apparent density | | kg/m³ | 102.3 | 60.8 | 95.7 | 56.6 |
| | | Average cell diameter | | μm | 210 | 220 | 210 | 220 |
| | | Cover layer thickness | | μm | 7 | 7 | 7 | 7 |
| | | High temperature peak calorific value | | J/g | 10.0 | 8.6 | 16.1 | 15.7 |
| Molded Article | Molding conditions | Applied inside pressure | | MPa(G) | 0 | 0 | 0 | 0 |
| | | Molding pressure | | MPa(G) | 0.20 | 0.22 | 0.32 | 0.30 |
| | Physical properties | Fusion bonding | | — | ○ | ○ | ○ | ○ |
| | | Apparent density | | kg/m³ | 38.8 | 38.6 | 43.9 | 42.7 |
| | | 50% Compressive strength | | kPa | 328 | 326 | 382 | 369 |
| | | Shrinkage | | ‰ | 20 | 20 | 20 | 20 |
| | | Closed cell content | | % | 88 | 87 | 88 | 88 |
| | | Surface resistivity *1 | | Ω | $1.4 \times 10^8$ | $5.6 \times 10^6$ | $3.5 \times 10^5$ | $1.2 \times 10^7$ |
| | | Surface resistivity *2 | | Ω | $1.5 \times 10^8$ | $5.6 \times 10^6$ | $3.5 \times 10^5$ | $1.5 \times 10^7$ |
| | | Charge decay *1 | | — | ○ | ○ | ○ | ○ |
| | | Charge decay *2 | | — | ○ | ○ | ○ | ○ |

| Example | | | | 13 | 14 | 15 |
|---|---|---|---|---|---|---|
| Resin Particles | Cover layer | Raw resin PP resin | Kind | PP1 | PP1 | PP1 |
| | | | wt % | 94 | 94 | 94 |
| | | PE resin | Kind | PE3 | PE4 | PE5 |

TABLE 6-continued

| | | | | | | | | |
|---|---|---|---|---|---|---|---|---|
| | | | | | wt % | 6 | 6 | 6 |
| | | | | CB | Kind | CB1 | CB1 | CB1 |
| | | | | | Part by wt. | 10 | 10 | 10 |
| | | | | Elastomer | Kind | EO1 | EO1 | EO1 |
| | | | | | Part by wt. | 3 | 3 | 3 |
| | | | Proportion | | wt % | 10 | 10 | 10 |
| | | Core layer | Raw resin | Polypropylene resin | Kind | PP2 | PP2 | PP2 |
| | | | Proportion | | wt % | 90 | 90 | 90 |
| | | Surface resistivity *1 | | | Ω | $1.2 \times 10^2$ | $1.1 \times 10^2$ | $1.2 \times 10^2$ |
| Expanded Beads | Foaming conditions | Blowing agent | | | — | $CO_2$ | $CO_2$ | $CO_2$ |
| | | Vessel inside pressure | | | MPa(G) | 3.80 | 3.75 | 3.80 |
| | | Foaming temperature | | | ° C. | 151.5 | 149.5 | 151.5 |
| | | Two step expansion | | | — | no | no | no |
| | Physical properties | Apparent density | | | kg/m$^3$ | 57.7 | 56.3 | 60.8 |
| | | Average cell diameter | | | μm | 190 | 220 | 220 |
| | | Cover layer thickness | | | μm | 7 | 7 | 7 |
| | | High temperature peak calorific value | | | J/g | 10.7 | 16 | 10.1 |
| Molded Article | Molding conditions | Applied inside pressure | | | MPa(G) | 0 | 0 | 0 |
| | | Molding pressure | | | MPa(G) | 0.24 | 0.28 | 0.24 |
| | Physical properties | Fusion bonding | | | — | ○ | ○ | ○ |
| | | Apparent density | | | kg/m$^3$ | 42.7 | 40.5 | 37.0 |
| | | 50% Compressive strength | | | kPa | 369 | 346 | 310 |
| | | Shrinkage | | | ‰ | 18 | 20 | 18 |
| | | Closed cell content | | | % | 88 | 87 | 88 |
| | | Surface resistivity *1 | | | Ω | $2.4 \times 10^6$ | $9.3 \times 10^6$ | $8.8 \times 10^5$ |
| | | Surface resistivity *2 | | | Ω | $2.7 \times 10^6$ | $9.4 \times 10^6$ | $8.9 \times 10^5$ |
| | | Charge decay *1 | | | — | ○ | ○ | ○ |
| | | Charge decay *2 | | | — | ○ | ○ | ○ |

TABLE 7

| | | Comparative Example | | | | 1 | 2 | 3 | 4 |
|---|---|---|---|---|---|---|---|---|---|
| Resin Particles | | Cover layer | Raw resin | PP resin | Kind | PP1 | PP1 | PP1 | PP1 |
| | | | | | wt % | 100 | 100 | 100 | 100 |
| | | | | PE resin | Kind | — | — | — | — |
| | | | | | wt % | — | — | — | — |
| | | | | CB | Kind | CB1 | CB1 | CB2 | CB1 |
| | | | | | Part by wt. | 10 | 10 | 25 | 10 |
| | | | | Elastomer | Kind | — | — | — | EO1 |
| | | | | | Part by wt. | — | — | — | 5 |
| | | | Proportion | | wt % | 5 | 10 | 10 | 10 |
| | | Core layer | Raw resin | Polypropylene resin | Kind | PP2 | PP2 | PP2 | PP2 |
| | | | Proportion | | wt % | 95 | 90 | 90 | 90 |
| | | Surface resistivity *1 | | | Ω | $9.9 \times 10^1$ | $1.2 \times 10^2$ | $9.8 \times 10^1$ | $1.5 \times 10^2$ |
| Expanded Beads | Foaming conditions | Blowing agent | | | — | $CO_2$ | $CO_2$ | $CO_2$ | $CO_2$ |
| | | Vessel inside pressure | | | MPa(G) | 3.80 | 3.80 | 3.80 | 3.80 |
| | | Foaming temperature | | | ° C. | 150.5 | 149.5 | 149.5 | 149.5 |
| | | Two step expansion | | | — | no | no | no | no |
| | Physical properties | Apparent density | | | kg/m$^3$ | 88.9 | 88.3 | 91.1 | 92.3 |
| | | Average cell diameter | | | μm | 200 | 190 | 210 | 220 |
| | | Cover layer thickness | | | μm | 3 | 7 | 7 | 7 |
| | | High temperature peak calorific value | | | J/g | 12.5 | 17.9 | 17.9 | 17.5 |
| Molded Article | Molding conditions | Applied inside pressure | | | MPa(G) | 0 | 0 | 0 | 0 |
| | | Molding pressure | | | MPa(G) | 0.26 | 0.28 | 0.26 | 0.26 |
| | Physical properties | Fusion bonding | | | — | ○ | ○ | ○ | ○ |
| | | Apparent density | | | kg/m$^3$ | 42.1 | 45.5 | 48.6 | 50.3 |
| | | 50% Compressive strength | | | kPa | 362 | 399 | 435 | 454 |
| | | Shrinkage | | | ‰ | 20 | 18 | 20 | 20 |
| | | Closed cell content | | | % | 88 | 87 | 88 | 87 |
| | | Surface resistivity *1 | | | Ω | $6.4 \times 10^3$ | $3.8 \times 10^3$ | $2.9 \times 10^2$ | $2.9 \times 10^3$ |
| | | Surface resistivity *2 | | | Ω | $5.8 \times 10^3$ | $3.7 \times 10^3$ | $2.8 \times 10^2$ | $2.7 \times 10^3$ |
| | | Charge decay *1 | | | — | ○ | ○ | ○ | ○ |
| | | Charge decay *2 | | | — | ○ | ○ | ○ | ○ |

TABLE 7-continued

| | | | | | Comparative Example | 5 | 6 | 7 |
|---|---|---|---|---|---|---|---|---|
| Resin Particles | | Cover layer | Raw resin | PP resin | Kind | PP1 | PP1 | PP1 |
| | | | | | wt % | 100 | 100 | 100 |
| | | | | PE resin | Kind | — | — | — |
| | | | | | wt % | — | — | — |
| | | | | CB | Kind | CB1 | CB1 | CB1 |
| | | | | | Part by wt. | 10 | 10 | 10 |
| | | | | Elastomer | Kind | EO1 | EO1 | EO1 |
| | | | | | Part by wt. | 5 | 5 | 5 |
| | | | Proportion | | wt % | 10 | 10 | 10 |
| | | Core layer | Raw resin | Polypropylene resin | Kind | PP2 | PP2 | PP2 |
| | | | Proportion | | wt % | 90 | 90 | 90 |
| | | Surface resistivity *1 | | | Ω | $1.0 \times 10^2$ | $1.0 \times 10^2$ | $1.0 \times 10^2$ |
| Expanded Beads | Foaming conditions | Blowing agent | | | — | $CO_2$ | $CO_2$ | $CO_2$ |
| | | Vessel inside pressure | | | MPa(G) | 3.80 | 3.80 | 3.80 |
| | | Foaming temperature | | | ° C. | 149.5 | 149.5 | 149.5 |
| | | Two step expansion | | | — | yes | yes | yes |
| | Physical properties | Apparent density | | | kg/m³ | 39.7 | 34.7 | 20.8 |
| | | Average cell diameter | | | μm | 220 | 220 | 220 |
| | | Cover layer thickness | | | μm | 6 | 4 | 3 |
| | | High temperature peak calorific value | | | J/g | 17.2 | 17.0 | 16.8 |
| Molded Article | Molding conditions | Applied inside pressure | | | MPa(G) | 0.12 | 0.12 | 0.12 |
| | | Molding pressure | | | MPa(G) | 0.22 | 0.24 | 0.24 |
| | Physical properties | Fusion bonding | | | — | ○ | ○ | ○ |
| | | Apparent density | | | kg/m³ | 27.3 | 21.8 | 14.3 |
| | | 50% Compressive strength | | | kPa | 215 | 166 | 103 |
| | | Shrinkage | | | ‰ | 20 | 22 | 32 |
| | | Closed cell content | | | % | 88 | 88 | 88 |
| | | Surface resistivity *1 | | | Ω | $8.3 \times 10^3$ | $1.0 \times 10^{15}<$ | $1.0 \times 10^{15}<$ |
| | | Surface resistivity *2 | | | Ω | $9.5 \times 10^3$ | $1.0 \times 10^{15}<$ | $1.0 \times 10^{15}<$ |
| | | Charge decay *1 | | | — | ○ | ○ | ○ |
| | | Charge decay *2 | | | — | ○ | ○ | ○ |

The physical properties of the expanded beads and molded articles were measured as follows.

Surface Resistivity:

The surface resistivity of the molded articles was measured under both Environment Condition 1 and Environment Condition 2. In the case of Environment Condition 1 the molded article was aged at 23° C. and 10% RH for 1 day immediately after the production thereof, while in the case of Environment Condition 2 the molded article was aged at 23° C. and 50% RH for 1 day immediately after the production thereof. The aged molded articles was thereafter measured for its surface resistivity according to JIS C2170 (2004) at 23° C. and 10% RH in the case of the molded article aged under Environment Condition 1 and at 23° C. and a relative humidity of 50% in the case of the molded article aged under Environment Condition 2. Thus, a test piece having a length of 100 mm, a width of 100 mm and a thickness equal to that of the molded article was cut out from a center part of each of the aged molded articles. The surface resistivity was measured on the skin surface of each test piece using a resistivity meter (HIRESTA MCP-HT450, manufactured by Mitsubishi Chemical Analytech Co., Ltd.). When the measured value was less than $1\times10^4\Omega$, the surface resistivity was again measured on the skin surface using resistivity meter (LORESTA MCP-HT610, manufactured by Mitsubishi Chemical Analytech Co., Ltd.).

Charge Decay:

The charge decay time of the molded article was measured under both Environment Condition 1 and Environment Condition 2. In the case of Environment Condition 1 the molded article was aged at 23° C. and 10% RH for 1 day immediately after the production thereof, while in the case of Environment Condition 2 the molded article was aged at 23° C. and 50% RH for 1 day immediately after the production thereof. The charge decay was thereafter measured according to the method given below at 23° C. and 10% RH in the case of the molded article aged under Environment Condition 1 and at 23° C. and a relative humidity of 50% in the case of the molded article aged under Environment Condition 2.

The molded article test piece having a length of 150 mm, a width of 150 mm and a thickness of 10 mm was cut out from each molded article such that the skin surface remained as such. The charge decay was measured using a measuring device (Model 159HH, manufactured by Trek Japan Co., Ltd.). Thus, the test piece was placed on a measurement plate of the device and charged with a voltage of 1,300V. Thereafter, a center part of the test piece on the side opposite from the measurement plate was grounded using a copper wire. The time required for the voltage to decay from 1,000V to 100V was measured. When the decay time was 2 seconds or shorter, the charge decay was evaluated as being good (o). The charge decay was evaluated as being no good (x) when the decay time was over 2 seconds.

Figure 3:
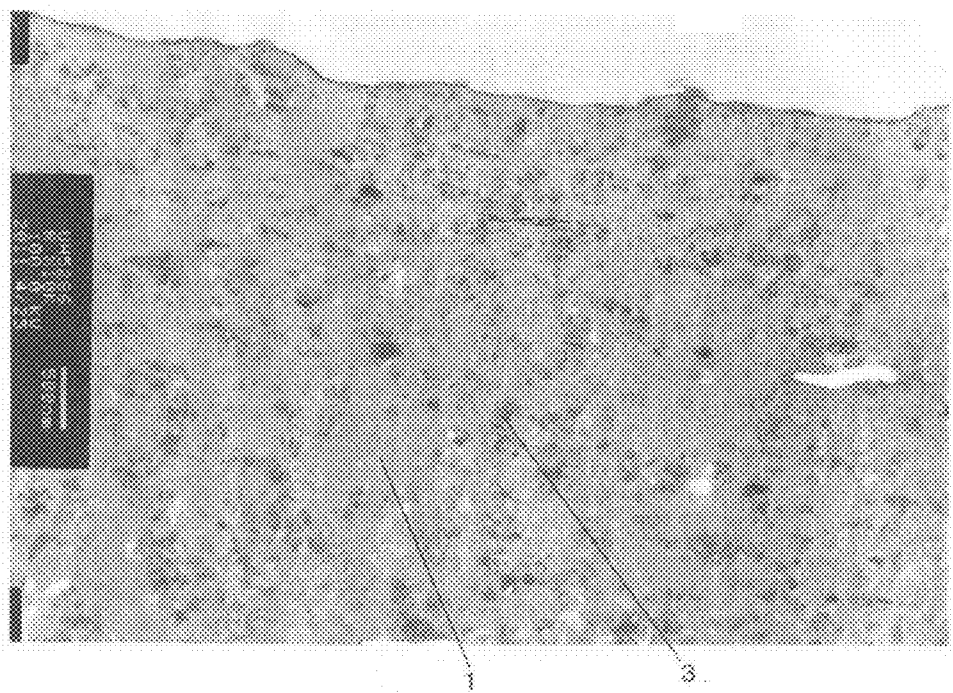
FIG. 3 is a microphotograph of a cross-section of a mixed resin cover layer an expanded bead obtained in Comparative Example 2, showing a dispersed state of electrically conductive carbon black.

Morphology Observation of Cover Layer of Expanded Beads:

A dispersion state of the PE resin in the PP resin continuous phase of the cover layer was investigated by the following method. A sample for observation was cut out from the cover layer, embedded in an epoxy resin and stained with ruthenium tetraoxide. An ultrathin slice was then cut out using an ultramicrotome. The slice was placed on a grid and measured by a transmission electron microscope (JEM1010 manufactured by JEOL Ltd.) at 20,000 fold magnification to observe the morphology of the cross-section of the cover layer of the expanded bead. FIG. 1 is a microphotograph of the expanded bead obtained in Example 1 and FIG. 3 is a microphotograph of the expanded bead obtained in Comparative Example 2. From FIG. 1, it is seen that the PE resin (which is stained and seen dark in the microphotograph) is dispersed in the PP resin continuous phase 1. In the case of the expanded bead whose cover layer is composed only of the PP resin, on the other hand, CB is dispersed in the PP resin 1 in clusters as will be seen from FIG. 3.

Figure 2:
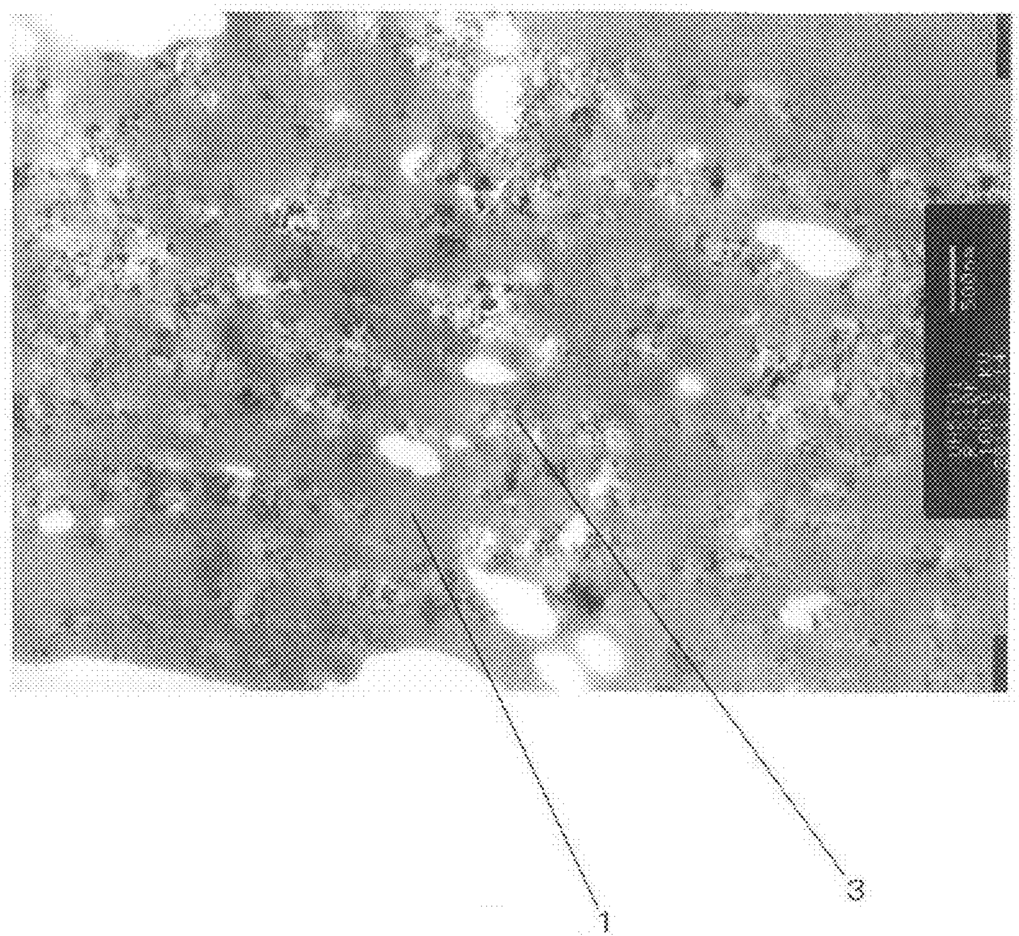
FIG. 2 is a microphotograph of a cross-section of a mixed resin cover layer of an expanded bead obtained in Example 1, showing a dispersed state of electrically conductive carbon black.

For the purpose of confirming the dispersion state of CB, the slice piece stained with ruthenium tetraoxide was discolored and measured by a transmission electron microscope (JEM1010 manufactured by Hitachi Ltd.) at 20,000 fold magnification. FIG. 2 is a microphotograph of the expanded bead obtained in Example 3. From FIG. 2, it is seen that, in the expanded bead whose cover layer is constituted of a PP resin continuous phase and PE resin dispersed phases, CB is present in the domains having nearly the same size as that of the dispersed phases.

The above-described observation of morphology has revealed that, in the cover layer of the expanded beads of Examples, the PP resin forms a continuous phase (matrix) while the PE resin forms dispersed phases (domains) with the CB being more distributed unevenly to the dispersed phases.

Fusion Bonding:

Fusion bonding was evaluated as follows. The molded article was bent and ruptured. The ruptured cross section was observed to count a number (C1) of the expanded beads present on the surface and a number (C2) of the broken expanded beads among them. The percentage ($C2/C1\times100$) of the broken expanded beads based on the expanded beads was calculated as a material failure percentage. The above procedure was repeated five times in total. The arithmetic mean of the five material failure percentages represents the degree of fusion bonding. When the material failure percentage was 80% or higher, the fusion bonding was evaluated as being good and shown as (o) in Tables 5 to 7. Otherwise, the fusion bonding was no good and shown as (x) in Tables 5 to 7.

Apparent Density of Expanded Beads:

A group of expanded beads (about 500 $cm^3$), which had been allowed to stand at 23° C., a relative humidity of 50% under 1 atm for 2 days, were weighed (g) and immersed in 300 cc water contained in a measuring cylinder using a wire net. From the rise of the water level in the measuring cylinder, a volume (V ($cm^3$)) of the group of the expanded beads was measured. The apparent density ($kg/m^3$) of the expanded beads was determined by dividing the weight W of the group of the expanded beads by the volume V thereof (W/V), followed by unit conversion.

Average Cell Diameter of Expanded Beads:

The average cell diameter of the expanded beads was measured by the method described previously.

Average Thickness of Cover Layer of Expanded Beads:

The average thickness of the cover layer of the expanded beads was determined from the afore-mentioned relational expression with the shape of the composite expanded beads being regarded as being circular-columnar.

High Temperature Peak Calorific Value of Expanded Beads:

From the obtained expanded beads, 10 of them were sampled at random. Each expanded bead was measured by the above-described method for its high temperature peak calorific value. The arithmetic mean of the ten measured values represents the high temperature peak calorific value of the expanded beads.

Apparent Density of Molded Article:

The apparent density of the molded article was calculated by dividing the weight of thereof by the volume thereof that was determined from the outer dimensions thereof, followed by unit conversion ($kg/m^3$).

Compressive Property:

According to JIS K7220(2006), 50% compression stress was measured.

Closed Cell Content:

Three test pieces were cut out at random from the molded article. Each test piece was measured for the closed cell content by the method described previously. The arithmetic mean of the three calculated values represents the closed cell content of the molded article.

Shrinkage:

The shrinkage (‰) of the molded article was calculated from the formula $(250[mm]-\text{length of molded article})\times1000/250[mm]$, where 250[mm] is a dimension of the molded cavity and (length of molded article) is the length of the molded article measured as follows. The molded article was aged at 80° C. for 12 hours, allowed to gradually cool and again, further aged at 23° C. for 6 hours and, thereafter, measured for its length.

EXPLANATION OF REFERENCE NUMERALS

1: PP resin
2: PE resin
3: CB

The invention claimed is:

1. An electrostatic dissipative, polypropylene-based resin expanded bead comprising a polypropylene-based expanded core layer, and a polyolefin-based resin cover layer that covers the expanded core layer, said expanded bead being obtained by foaming and expanding a composite resin particle, which has a polypropylene-based resin core layer covered with a polyolefin-based resin cover layer containing electrically conductive carbon black, in such a way that said expanded bead has an apparent density of 10 to 120 $kg/m^3$, wherein the polyolefin-based resin that constitutes the polyolefin-based resin cover layer of said expanded bead is a mixed resin containing a polypropylene-based resin and a polyethylene-based resin, wherein, in the polyolefin-based resin cover layer, the polypropylene-based resin forms a continuous phase, the polyethylene-based resin forms dispersed phases, and the electrically conductive carbon black is unevenly distributed to the dispersed phases side, wherein the electrically conductive carbon black is present in an amount of 5 to 30 parts by weight per 100 parts by weight of a total amount of the polypropylene-based resin and the polyethylene-based resin, and wherein a weight ratio of the polypropylene-based resin to the polyethylene-based resin which is 99.5:0.5 to 50:50.

2. The polypropylene-based resin expanded bead according to claim 1, wherein the polyolefin-based cover layer of said expanded bead has an average thickness of 0.2 μm or more.

3. The polypropylene-based resin expanded bead according to claim 2, wherein the electrically conductive carbon black is Ketjen black and present in an amount of 5 to 15 parts by weight per 100 parts by weight of the mixed resin of the polypropylene-based resin and the polyethylene-based resin.

4. A molded article that is obtained by in-mold molding of the polypropylene-based resin expanded beads according to claim 2, said molded article having a surface resistivity of $1\times10^5$ to $1\times10^{10}\Omega$.

5. The polypropylene-based resin expanded bead according to claim 1, wherein the electrically conductive carbon black is Ketjen black and present in an amount of 5 to 15 parts by weight per 100 parts by weight of the mixed resin of the polypropylene-based resin and the polyethylene-based resin.

6. A molded article that is obtained by in-mold molding of the polypropylene-based resin expanded beads according to claim 5, said molded article having a surface resistivity of $1\times10^5$ to $1\times10^{10}\Omega$.

7. A molded article that is obtained by in-mold molding of the polypropylene-based resin expanded beads according to claim 1, said molded article having a surface resistivity of $1\times10^5$ to $1\times10^{10}\Omega$.

8. The polypropylene-based resin expanded bead according to claim 1, wherein the polyethylene-based resin is present in an amount of 0.5 part by weight or more and less than 20 parts by weight per 100 parts by weight of a total amount of the polypropylene-based resin and the polyethylene-based resin.

9. The polypropylene-based resin expanded bead according to claim 8, wherein the polyolefin-based resin cover layer is in a substantially unexpanded state.

10. The polypropylene-based resin expanded bead according to claim 9, wherein the polyolefin-based cover layer of said expanded bead has an average thickness of 0.2 μm or more.

11. The polypropylene-based resin expanded bead according to claim 10, wherein the electrically conductive carbon black is Ketjen black and present in an amount of 5 to 15 parts by weight per 100 parts by weight of the mixed resin of the polypropylene-based resin and the polyethylene-based resin.

12. The polypropylene-based resin expanded bead according to claim 9, wherein the electrically conductive carbon black is Ketjen black and present in an amount of 5 to 15 parts by weight per 100 parts by weight of the mixed resin of the polypropylene-based resin and the polyethylene-based resin.

13. The polypropylene-based resin expanded bead according to claim 8, wherein the polyolefin-based cover layer of said expanded bead has an average thickness of 0.2 μm or more.

14. The polypropylene-based resin expanded bead according to claim 13, wherein the electrically conductive carbon black is Ketjen black and present in an amount of 5 to 15 parts by weight per 100 parts by weight of the mixed resin of the polypropylene-based resin and the polyethylene-based resin.

15. The polypropylene-based resin expanded bead according to claim 8, wherein the electrically conductive carbon black is Ketjen black and present in an amount of 5 to 15 parts by weight per 100 parts by weight of the mixed resin of the polypropylene-based resin and the polyethylene-based resin.

16. A molded article that is obtained by in-mold molding of the polypropylene-based resin expanded beads according to claim 8, said molded article having a surface resistivity of $1\times10^5$ to $1\times10^{10}\Omega$.

17. The polypropylene-based resin expanded bead according to claim 1, wherein the polyolefin-based resin cover layer is in a substantially unexpanded state.

18. The polypropylene-based resin expanded bead according to claim 17, wherein the polyolefin-based cover layer of said expanded bead has an average thickness of 0.2 μm or more.

19. The polypropylene-based resin expanded bead according to claim 18, wherein the electrically conductive carbon black is Ketjen black and present in an amount of 5 to 15 parts by weight per 100 parts by weight of the mixed resin of the polypropylene-based resin and the polyethylene-based resin.

20. The polypropylene-based resin expanded bead according to claim 17, wherein the electrically conductive carbon black is Ketjen black and present in an amount of 5 to 15 parts by weight per 100 parts by weight of the mixed resin of the polypropylene-based resin and the polyethylene-based resin.

* * * * *